(12) United States Patent
Orumchian et al.

(10) Patent No.: US 7,558,784 B2
(45) Date of Patent: Jul. 7, 2009

(54) OPERATING PLAN DATA AGGREGATION SYSTEM WITH REAL-TIME UPDATES

(75) Inventors: Kim Orumchian, Santa Clara, CA (US);
Art Stabenow, Santa Clara, CA (US);
Dean Skelton, Santa Clara, CA (US);
David Petiot, Santa Clara, CA (US)

(73) Assignee: Right90, Inc., Foster City, CA (US)

( * ) Notice: Subject to any disclaimer, the term of this patent is extended or adjusted under 35 U.S.C. 154(b) by 73 days.

(21) Appl. No.: 11/115,970

(22) Filed: Apr. 26, 2005

(65) Prior Publication Data

US 2006/0074741 A1    Apr. 6, 2006

Related U.S. Application Data

(60) Provisional application No. 60/565,758, filed on Apr. 26, 2004.

(51) Int. Cl.
*G06F 7/00*     (2006.01)
*G06F 17/30*   (2006.01)

(52) U.S. Cl. .......................................... 707/3; 707/100

(58) Field of Classification Search ............ 707/3, 707/100, 101, 102; 705/10
See application file for complete search history.

(56) References Cited

U.S. PATENT DOCUMENTS

| | | | |
|---|---|---|---|
| 5,873,097 A | 2/1999 | Harris et al. | |
| 5,926,820 A | 7/1999 | Agrawal et al. | |
| 6,094,651 A | 7/2000 | Agrawal et al. | |
| 6,108,647 A | 8/2000 | Poosala et al. | |
| 6,317,686 B1* | 11/2001 | Ran | 701/210 |
| 6,366,905 B1 | 4/2002 | Netz | |
| 6,430,565 B1 | 8/2002 | Berger et al. | |
| 6,766,325 B1* | 7/2004 | Pasumansky et al. | 707/101 |
| 6,775,675 B1* | 8/2004 | Nwabueze et al. | 707/100 |
| 2002/0178077 A1* | 11/2002 | Katz et al. | 705/26 |
| 2004/0193576 A1* | 9/2004 | Petculescu et al. | 707/3 |
| 2005/0044197 A1* | 2/2005 | Lai | 709/223 |

* cited by examiner

*Primary Examiner*—Charles Rones
*Assistant Examiner*—Fariborz Khoshnoodi
(74) *Attorney, Agent, or Firm*—Perkins Coie LLP

(57) ABSTRACT

System, method and apparatus for forecasting data with real-time updates. The system includes an analysis server including an OLAP cube. System also includes information database coupled to analysis server to support the OLAP cube. System may include a first client and an analysis server coupled to first client. System may further include first customer information database coupled to analysis server. Method of maintaining information may include receiving set of forecast data, incorporating the forecast data into information database through OLAP cube, extracting a baseline forecast from the database, and receiving updates to database. Method may include propagating updates throughout the information through the OLAP cube.

22 Claims, 26 Drawing Sheets

Right 90     ⊟ ☐ ☒

File Edit Tools Help

Edit  Submit — 210
   — 215

Current User  Kim Orumchian
Forecast Status  UPDATING — 205

F o r e c a s t   T r e e

| | | | | | | | | |
|---|---|---|---|---|---|---|---|---|
| Forecast Total | | 16600 | ? | $262,700 | 18600 | ? | $307,700 | 192,433 | $4,451,941 |
| − Kim Orumchain  220 | | 16600 | ? | $262,700 | ? | ? | $307,700 | 192,433 | $4,451,941 |
| − Intel  230 | | 6700 | ? | $60,000 | 7100 | ? | $56,100 | 40,631 | $390.765 |
| − ML2722  240 | | ? | ? | $27,000 | ? | ? | $33,600 | 24,300 | $145,800 |
| 245 | Backlog | 4500 | $6 | $27,000 | 5600 | ? | ? | 24,300 | $145,800 |
| | Backlog [surplus/deficit] | 0 | $6.00 | $0 | 0 | $6.00 | $0 | 0 | $0 |
| | Last Period Forecast | 4300 | $6 | $25,800 | 9200 | $6 | $18,200 | 10,900 | $65,400 |
| | % Change Current/Last | %5 | %0 | %5 | %75 | %0 | %75 | 122.94% | 122.94% |
| + ML2723 | | | | $33,000 | | | $22,500 | 16.331 | $244,965 |

Customers

Products 250      260      270

CONNECTED TO: R90WEB1     Current User  Kim Orumchian

200     FIG. 2

| Home | Logout | FORECAST SUMMARY | Forecast Summary ▽ for Q2+Q3 ▽ Measured by Dollars ▽ |
|---|---|---|---|

Marty Green  345
VP Sales
Acme Semiconductor  340

Your approval is needed

APPROVAL FORECAST

| Forecast Tools | ▽ | 335 |
| Drill-down | ▽ | 330 |
| Settings | ▽ | 325 |
| Help & Support | ▽ | 320 |

315

All Areas/East USA/NE USA/SalesInc.      370      375

Forecast Overview  View By: Months ▽  Type: Table ▽

| Rep. | Apr. 2003 | May 2003 | Jun. 2003 | Q2 | Jul. 2003 | Aug. 2003 | Sep. 2003 | Q3 | Forecast Total |
|---|---|---|---|---|---|---|---|---|---|
| Hill | $0.05M | $0.06M | $0.08M | $0.19M | $0.06M | $0.07M | $0.09M | $0.24M | $0.43M |
| Orumchian | $0.26M | $0.31M | $2.72M | $3.29M | $0.26M | $0.48M | $0.42M | $1.16M | $4.45M |
| Skelton | $0.00M | $0.00M | $0.00M | $0.00M | $0.00M | $0.00M | $0.00M | $0.00M | $0.00M |
| Syed | $0.01M | $0.01M | $0.01M | $0.03M | $0.01M | $0.01M | $0.01M | $0.03M | $0.04M |
| Total | $0.32M | $0.38M | $2.81M | $3.51M | $0.35M | $0.56M | $0.52M | $1.43M | $4.94M |

310

Positive Impacts

Orumchian has increased their sales forecast total $3.22M from last. ▲ 260.80%
ML2724 has seen an increase in forecast total of $2.57M from last forecast. ▲ 459.69%
nVidia has seen an increase in forecast total of $2.42M from last forecast. ▲ 636.22%
Seagate has seen an increase in forecast total of $0.30M from last forecast. ▲ 58.91%
Cisco has seen an increase in forecast total of $0.30M from last forecast. ▲ 121.94%

Negative Impacts Sales Inc.,

No Relevant Data

Top 10 Customers

| Customer | Forecast |
|---|---|
| nVidia | $$2.81M |
| Seagate | $$0.81M |
| Cisco | $$0.55M |
| Intel | $$0.39M |
| Spartan | $$0.32M |
| Motorola | $$0.04M |

| | | | | | | | | | |
|---|---|---|---|---|---|---|---|---|---|
| Home | Logout | FORECAST SUMMARY 365 — Forecast Summary ▽ for Q2+Q3 ▽ Measured by Dollars ▽ | | | | | | | |
| Marty Green | | All Areas/East USA/NE USA — 370 — 375 | | | | | | | |
| VP Sales | | Forecast Overview | | | View By: Months ▽ | Type: Table ▽ | | | |
| Acme Semiconductor | | Rep. Firm | Apr. 2003 | May 2003 | Jun.2003 | Q2 | Jul.2003 | Aug.2003 | Sep.2003 | Q3 | Forecast Total |
| Your approval is needed | | Sales Inc. | $0.32M | $0.38M | $2.81M | $3.51M | $0.34M | $0.56M | $0.52M | $1.42M | $4.92M |
| APPROVAL FORECAST | | Total | $0.32M | $0.38M | $2.81M | $3.51M | $0.34M | $0.56M | $0.52M | $1.42M | $4.93M |

*(Note: table layout above adjusted for readability)*

Sidebar:
- Forecast Tools ▽
- Drill-down ▽
- Settings ▽
- Help & Support ▽

— 310

Positive Impacts

Sales Inc. has increased their sales forecast total $3.45M from last. ▲235.02%
ML2724 has seen an increase in forecast total of $2.57M from last forecast. ▲459.69%
nVidia has seen an increase in forecast total of $2.42M from last forecast. ▲636.22%
Seagate has seen an increase in forecast total of $0.30M from last forecast. ▲58.91%
Cisco has seen an increase in forecast total of $0.30M from last forecast. ▲121.94%

Negative Impacts Sales Inc.,

No Relevant Data

Top 10 Customers

| Customer | Forecast |
|---|---|
| nVidia | $$2.81M |
| Seagate | $$0.81M |
| Cisco | $$0.55M |
| Intel | $$0.39M |
| Spartan | $$0.32M |
| Motorola | $$0.04M |

| | 360 | | | | | | | | |
|---|---|---|---|---|---|---|---|---|---|
| Home    Logout | FORECAST SUMMARY | | Forecast Summary ▽ for Q2+Q3 ▽ Measured by Dollars ▽ | | | | | | |
| Marty Green | All Areas/East USA | | | | | | | | |
| VP Sales | Forecast Overview | | | View By: Months ▽ Type: Table ▽ | | | | | |
| Acme Semiconductor | Region | Apr. 2003 | May 2003 | Jun.2003 | Q2 | Jul.2003 | Aug.2003 | Sep.2003 | Q3 | Forecast Total |
| Your approval is needed | NE USA | $0.32M | $0.38M | $2.81M | $3.51M | $0.34M | $0.56M | $0.52M | $1.42M | $4.92M |
| APPROVAL FORECAST | SE USA | $0.56M | $0.53M | $1.26M | $2.35M | $0.50M | $0.66M | $0.64M | $1.80M | $4.16M |
| Forecast Tools ⊗ | Total | $0.68M | $0.91M | $4.07M | $5.86M | $0.84M | $1.22M | $1.16M | $3.22M | $9.08M |
| Drill-down ⊗ | | | | | | | | | | |
| Settings ⊗ | | | | | | | | | | |
| Help & Support ⊗ | | | | | | | | | | |

— 310

| | Top 10 Customers | |
|---|---|---|
| | Customer | Forecast |
| Positive Impacts | Customer | Forecast |
| NE USA. has increased their sales forecast total $3.45M from last. ▲235.02% | nVidia | $$2.81M |
| SE USA has seen an increase in forecast total of $2.66M from last forecast.▲ 177.40% | Dialogic | $$0.88M |
| ML2724 has seen an increase in forecast total of $2.57M from last forecast.▲ 459.68% | Seagate | $$0.81M |
| nVidia has seen an increase in forecast total of $2.42M from last forecast.▲ 636.22% | NEC | $$0.79M |
| ML2842 has seen an increase in forecast total of $0.77M from last forecast. ▲712.18% | Dell | $$0.75M |
| | ViewSonic | $$0.61M |
| Negative Impacts Sales Inc., | Cisco | $$0.55M |
| | APC | $$0.54M |
| No Relevant Data | SanDisk | $$0.41M |
| | Intel | $$0.39M |

| Area | Apr. 2003 | May 2003 | Jun. 2003 | Q2 | Jul. 2003 | Aug. 2003 | Sep. 2003 | Q3 | Forecast Total |
|---|---|---|---|---|---|---|---|---|---|
| Asia Pacific | $0.56M | $1.17M | $0.58M | $2.31M | $0.43M | $0.54M | $0.51M | $1.48M | $3.79M |
| East USA | $0.87M | $0.91M | $4.07M | $5.85M | $0.84M | $1.22M | $1.16M | $3.22M | $9.07M |
| West USA | $0.37M | $0.99M | $0.51M | $1.87M | $0.37M | $0.46M | $0.41M | $1.26M | $3.13M |
| Total | $1.80M | $3.07M | $5.16M | $10.03M | $1.64M | $2.24M | $2.08M | $5.96M | $15.99M |

Areas & Entities / Customers / Products

Positive Impacts

East USA. has increased their sales forecast total $6.11M from last.▲205.90%
ML2724 has seen an increase in forecast total of $3.41M from last forecast.▲336.09%
nVidia has seen an increase in forecast total of $2.42M from last forecast.▲636.22%
Asia Pacific has seen an increase in forecast total of $2.04M from last forecast.▲116.94%
West USA has seen an increase in forecast total of $1.62M from last forecast.▲107.18%

Negative Impacts

No Relevant Data

Top 10 Customers

| Customer | Forecast |
|---|---|
| nVidia | $$2.81M |
| dLink | $$1.30M |
| Netgear | $$1.30M |
| Dialogic | $$0.88M |
| Arris | $$0.87M |
| Seagate | $$0.81M |
| NEC | $$0.79M |
| Dell | $$0.75M |
| MSI | $$0.71M |
| Pioneer | $$0.69M |

FIG. 6

| | | | | | | | | | |
|---|---|---|---|---|---|---|---|---|---|
| Home Logout | FORECAST SUMMARY | | Forecast Summary ▽ for Q2+Q3 ▽ Measured by Dollars ▽ | | | | | | |
| Marty Green | All Prod Families — 360 | | | | | | | | |
| VP Sales | Forecast Overview | | View By: Months ▽ Type: Table ▽ | | | | | | |
| Zoran Semiconductor | Product | Apr. 2003 | May 2003 | Jun.2003 | Q2 | Jul.2003 | Aug.2003 | Sep.2003 | Q3 | Forecast Total |
| Your approval is needed | ML2722 | $0.08M | $0.07M | $0.06M | $0.21M | $0.05M | $0.06M | $0.07M | $0.18M | $0.38M |
| APPROVAL FORECAST | ML2723 | $0.05M | $0.06M | $0.10M | $0.21M | $0.10M | $0.12M | $0.07M | $0.29M | $0.50M |
| | ML2724 | $0.16M | $0.78M | $2.62M | $3.56M | $0.22M | $0.32M | $0.32M | $0.86M | $4.42M |
| Forecast Tools ▽ | ML2725 | $0.06M | $0.08M | $0.19M | $0.33M | $1.04M | $0.17M | $0.16M | $0.97M | $0.71M |
| Drill-down ▽ | ML2726 | $0.31M | $0.40M | $0.23M | $0.94M | $0.16M | $0.18M | $0.23M | $0.57M | $1.51M |
| Settings ▽ | ML2727 | $0.06M | $0.06M | $0.12M | $0.24M | $0.15M | $0.18M | $0.11M | $0.44M | $0.68M |
| Help & Support ▽ | ML2728 | $0.10M | $0.87M | $0.15M | $0.92M | $0.12M | $0.13M | $0.13M | $0.38M | $1.30M |
| | ML2833 | $0.05M | $0.10M | $0.03M | $0.18M | $0.03M | $0.03M | $0.06M | $0.12M | $0.30M |
| | Total | $2.94M | $4.36M | $4.34M | $11.66M | $1.88M | $2.91M | $2.47M | $7.24M | $18.90M |

| Areas & Entities | Customers | Products | | Top 10 Customers | |
|---|---|---|---|---|---|
| ○Indicates the existence of change history. click to view | | | | Customer | Forecast |
| Positive Impacts | | | | nVidia | $$2.81M |
| | | | | dLink | $$1.30M |
| East USA. has increased their sales forecast total $6.11M from last.▲205..90% | | | | Netgear | $$1.30M |
| ML2724 has seen an increase in forecast total of $3.41M from last forecast.▲336.09% | | | | Dialogic | $$0.88M |
| nVidia has seen an increase in forecast total of $2.42M from last forecast.▲636.22% | | | | Arris | $$0.87M |
| Asia Pacific has seen an increase in forecast total of $2.04M from last.▲116.94% | | | | Seagate | $$0.81M |
| West USA has seen an increase in forecast total of $1.62M from last.▲107.18% | | | | NEC | $$0.79M |
| | | | | Dell | $$0.75M |
| Negative Impacts Sales Inc., | | | | MSI | $$0.71M |
| No Relevant Data | | | | Pioneer | $$0.69M |

FIG. 13

| | | | | | | | | | | |
|---|---|---|---|---|---|---|---|---|---|---|
| Home    Logout | FORECAST SUMMARY | | | Forecast Summary ▽ | | for Q2+Q3 ▽ | | Measured by Dollars ▽ | | |
| Marty Green | All Customers  ⌒ 360 | | | | | | | | | |
| VP Sales | Forecast Overview | | | View By: Months ▽ | | Type: Table ▽ | | | | |
| Zoran Semiconductor | Product | Apr. 2003 | May 2003 | Jun.2003 | Q2 | Jul.2003 | Aug.2003 | Sep.2003 | Q3 | Forecast Total |
| Your approval is needed | AMD | $0.02M | $0.03M | $0.06M | $0.13M | $0.03M | $0.06M | $0.03M | $0.12M | $0.25M |
| APPROVAL FORECAST | APC | $0.05M | $0.06M | $0.15M | $0.26M | $0.03M | $0.13M | $0.12M | $0.28M | $0.54M |
| | Arris | $0.12M | $0.20M | $0.14M | $0.46M | $0.10M | $0.15M | $0.16M | $0.41M | $0.87M |
| Forecast Tools  ▽ | BrightLine | $0.08M | $0.05M | $0.03M | $0.25M | $0.02M | $0.03M | $0.02M | $0.07M | $0.23M |
| Drill-down  ▽ | Cartwright Inc | $0.08M | $0.09M | $0.08M | $0.16M | $0.07M | $0.07M | $0.07M | $0.21M | $0.46M |
| Settings  ▽ | Cisco | $0.09M | $0.10M | $0.08M | $0.27M | $0.10M | $0.10M | $0.08M | $0.28M | $0.55M |
| Help & Support  ▽ | Dell | $0.00M | $0.10M | $0.10M | $0.31M | $0.18M | $0.17M | $0.10M | $0.45M | $0.75M |
| | Dialogic | $0.02M | $0.02M | $0.74M | $0.78M | $0.01M | $0.05M | $0.05M | $0.11M | $0.88M |
| | Total | $2.12M | $2.06M | $5.68M | $10.75M | $2.148M | $2.84M | $4.81M | $9.79M | $20.55M |

| Areas & Entities | Customers | Products | Top 10 Products | |
|---|---|---|---|---|
| | ∘Indicates the existence of change history. click to view | | Product | Forecast |
| Positive Impacts | | | ML2724 | $$4.42M |
| East USA. has increased their sales forecast total $6.11M from last.▲205.90% | | | ML2841 | $$1.66M |
| ML2724 has seen an increase in forecast total of $3.41M from last forecast. ▲336.09% | | | ML2726 | $$1.51M |
| nVidia has seen an increase in forecast total of $2.42M from last forecast.▲ 636.22% | | | ML2728 | $$1.30M |
| Asia Pacific has seen an increase in forecast total of $2.04M from last forecast.▲116.94% | | | ML2845 | $$1.02M |
| West USA has seen an increase in forecast total of $1.62M from last forecast.▲107.18% | | | ML2843 | $$0.88M |
| | | | ML2747 | $$0.74M |
| Negative Impacts Sales Inc., | | | ML2725 | $$0.71M |
| No Relevant Data | | | ML2827 | $$0.58M |
| | | | ML2844 | $$0.54M |

FIG. 14

| Home Logout | Drill-down | |
|---|---|---|
| Marty Green | | [x] export |
| VP Sales Zoran Semiconductor | / Forecast Gap Analysis / Production Analysis / Inventory Analysis \ [Sales Forecast vs. Actuals ▽] | |
| | Inventory Report: | |
| | The total difference between the current forecast and last quarter actual is: | |
| Continually Updated You will be notified when updates occur | Quarter 2: gap from previous quarter actuals<br>Revenue Dollars $3,129,066.64 +50.66% from $6,176,731.48<br>Margin Dollars $787,661.64 25.25% from $3,125,763.48 | $2,595,680.00 additional inventory dollars are required for 11 parts.<br>($874,276.00) less inventory dollars are required for 5 parts.<br>$1,721,404.00 net greater inventory dollars. |
| | Inventory Dollar Change Detail: | |
| | The following parts units are increasing | The following parts units are decreasing |
| Updates have been made | ML2724<br>Quarter 2: 116,916 units @ $12.00/unit = $1,426,992.00 additional inventory dollars | ML2727<br>Quarter 2: -36,956 @ $11.00/unit = ($406,516.00) fewer inventory dollars |
| Forecast Tools ⊚ | ML2843<br>Quarter 2: 68,400 units @ $6.50/unit = $444,600.00 additional inventory dollars | ML2834<br>Quarter 2: -31,940 @ $13.00/unit = ($415,220.00) fewer inventory dollars |
| Drill-down ⊚ | ML2728<br>Quarter 2: 19,620 units @ $20.00/unit = $392,400.00 additional inventory dollars | ML2722<br>Quarter 2: -3,842 @ $5.00/unit = ($19,210.00) fewer inventory dollars |
| Product Family Summary | | |
| Area Summary | ML2842<br>Quarter 2: 6,540 units @ $4.00/unit = $26,160.00 additional inventory dollars | ML2841<br>Quarter 2: -2,640 @ $6.00/unit = ($15,840.00) fewer inventory dollars |
| Executive Summaries | ML2833<br>Quarter 2: 5,311 units @ $8.00/unit = $42,488.00 additional inventory dollars | ML2723<br>Quarter 2: -1,749 @ $10.00/unit = ($17,490.00) fewer inventory dollars |
| Settings ⊚ | | |
| Help & Support ⊚ | ML2841<br>Quarter 2: 4,400 units @ $23.00/unit = $101,200.00 additional inventory dollars | |

FIG. 17

| | Drill-down | | |
|---|---|---|---|
| Home Logout<br>Marty Green<br>VP Sales<br>Zoran<br>Semiconductor | ☒ export | | |
| | Forecast Gap Analysis \ Production Analysis \ Inventory Analysis \ | | Sales Forecast vs. Updt. Fost. ▽ |
| | Gap Report: | | |
| | There was 1 course corrections that had a total impact of: | Based on these latest changes, the total gap between the original sales forecast and the current projected sales outcome is: | |
| Continually<br>Updated<br>You will be<br>notified<br>when updates<br>occur | | | |
| | Quarter 2: gap from original Quarter 2 forecast | Quarter 2: gap from original Quarter 2 forecast | |
| | Revenue Dollars $346,574.97+3.87% from $8,959,223.15 | Revenue Dollars $346,574.97+3.67% from $8,959,223.15 | |
| | Margin Dollars ($297,937.03) -7.07% from $4,211,362.15 | Margin Dollars ($297,937.03)-7.07% from$4,211.362.15 | |
| Updates have<br>been made | Quarter 3: gap from original Quarter 3 forecast | Quarter 3: gap from original Quarter 3 forecast | |
| | Revenue Dollars $0.00 0% from $5,959,503.00 | Revenue Dollars $0.00 0% from $5,956,503.00 | |
| | Margin Dollars $0.00 0% from $2,588,801.00 | Margin Dollars $0.00 0% from $2,588.801.00 | |
| Forecast ⊚<br>Tools | The elements that have factored most into this change are: | | |
| | Most significant positive regional changes by revenue dollars:<br>East USA $346,574.97 +4.33% $7,998,908.15 | Most significant negative regional changes by revenue dollars: | |
| Drill- down ⊚ | | | |
| Product Family<br>Summary | Most significant positive regional changes by margin dollars: | Most significant negative selling changes by margin dollars:<br>East USA ($297,937.03) -7.3% $4,078,888.15 | |
| Area Summary | Most significant positive selling entity changes by revenue dollars:<br>Sales Inc. $346,574.97 +4.00% $3,841,144.15 | Most significant negative selling entity changes by revenue dollars: | |
| Executive<br>Summaries | Most significant positive customer changes by margin dollars: | Most significant negative customer changes by margin dollars:<br>Sales Inc. ($297,937.03) -14.6% $2,030,614.15 | |
| | Most significant positive regional changes by revenue dollars:<br>nVidia $346,574.97 +18.65% $1,858,425.03 | Most significant negative product changes by revenue dollars: | |
| Settings ⊚ | Most significant positive product changes by margin dollars: | Most significant negative product changes by margin dollars:<br>nVidia ($297,937.03) -23.753% $1,254,437.03 | |
| Help &<br>Support ⊚ | Most significant positive product changes by revenue dollars:<br>ML2724 $346,574.97 +9.97% $3,475,425.03 | Most significant negative product changes by revenue dollars: | |
| | Most significant positive product changes by margin dollars: | Most significant negative product changes by margin dollars:<br>ML2724 ($297,937.03) -13.08% $2,278,537.03 | |

FIG. 18       405       300

| | | | | | | | |
|---|---|---|---|---|---|---|---|
| Home Logout | FORECAST SUMMARY | Sales Forecast vs. Actuals ▽ | for | Q2 ▽ | Measured by | Margin ▽ | |
| Marty Green | All | ⌒ 360 | | | | | |
| VP Sales | Forecast Overview | View By: Quarters▽ | Type: Table ▽ | | | | |
| Zoran Semiconductor | Area | Detail | | | | Q2/2003 | |

| | | | |
|---|---|---|---|
| | Asia Pacific | Actuals(-1 Quarter) | $1.41M |
| | | Forecast (adjusted) | $1.21M 14% |
| | East USA | Actuals(-1 Quarter) | $1.23M |
| | | Forecast (adjusted) ◊ | $2.19M 78% |
| | West USA | Actuals(-1 Quarter) | $0.49M |
| | | Forecast (adjusted) | $0.51M 4% |
| | Total | Actuals(-1 Quarter) | $3.13M |
| | | Forecast (adjusted) ◊ | $3.91M 25% |

Continually Updated
You will be notified
when updates occur
Updates have been made Forecast Tools ▽
Drill-down ▽
Settings ▽
Help & Support ▽

| Areas & Entities | Customers | Products |
|---|---|---|

◊Indicates the existence of change history. click to view

Positive Impacts

East USA: has increased their sales forecast margin $2.19M over last quarter. ▲178.21%
ML2724 has seen an increase in forecast margin of $1.43M over last quarter. ▲425.56%
Asia Pacific has seen an increase in forecast margin of $1.21M over last quarter. ▲85.89%
nVidia has seen an increase in forecast margin of $0.77M over last quarter. ▲793.27%
ML2841 has seen an increase in forecast margin of $0.72M over last quarter. ▲150.86%
310

315

Negative Impacts Sales Inc.,

ML2836 has seen a decrease in forecast margin of $0.02M over last quarter. ▼ Infinity

Top 10 Customers

| Customer | Margin | |
|---|---|---|
| nVidia | $772.20K | ▲693% |
| dLink | $581.40K | ▲189% |
| Netgear | $306.00K | ▲109% |
| Falcon | $286.00K | 9% |
| Viewsonic | $286.00K | ▲351% |
| NEC | $229.50k | ▲62% |
| Dell | $203.20K | ▲7% |
| Dialogic | $184.50K | ▲27% |
| Pioneer | $163.65 | ▼53% |
| Seagate | $142.09K | ▼14% |

| Home | Logout | FORECAST TOOLS |
|---|---|---|
| | | Judgement |

Marty Green
VP Sales    340
Zoran Semiconductor

How do you want to alter June/2003 for Orumehian /All Products /All Customers?

○ Apply change by percent

[increase ▽] forecast [revenue ▽] by [    ] % for the projection

— 440    or

◉ Apply change by value

Change forcast [units ▽] to [$1,410,248.00] for this projection 445    450

Result of the Change
Revenue  $1,410,248.45
Units      50,001

Pre-judgment Values
Revenue  $1,410,248.45
Units      50,001

[Your approval is needed]
[APPROVAL FORECAST]
[Forecast Tools ⊘]
[Drill-down ⊘]
[Settings ⊘]
[Help & Support ⊘]

[Submit]  [Cancel]    [Add notes to this change]

430

My Judgment History

| Date of Update | Type of Update | Amount of Update | Locales & Entries | Customer | Product | Time | |
|---|---|---|---|---|---|---|---|
| 4/5/2004 11:15:30 pm | UPDATE QUANITY | -48.2402% | Orumchian | | June/ 2003 | | Remove |

OPERATING PLAN DATA AGGREGATION SYSTEM WITH REAL-TIME UPDATES

CROSS-REFERENCE TO RELATED APPLICATIONS

This application claims priority to U.S. Provisional Patent Application Ser. No. 60/565,758, filed Apr. 26, 2004, which is hereby incorporated herein by reference.

BACKGROUND

Data is used by the investment and business communities to judge the value of investments, the business case for transactions, the performance of managers, and trends in industries, among many other things. Data may be used in other areas and by other communities to make judgments and decisions on a variety of matters. As such, data for a company or organization is important in general, and up-to-date data (such as projected sales data for example) is potentially invaluable. However, forecast data in a company is typically stored in formats or systems which are not amenable to updates on an asynchronous or random basis.

For example, forecasting cycles are often based on monthly and quarterly updates to information. Government regulations often require reporting on no more than a quarterly basis (every three months). Activities in the real world rarely occur on scheduled dates for updates, a customer may cancel or enhance an order at any time. Moreover, indirect actions with direct effects on customers (such as competitor product announcements or vendor supply changes for example) are also rarely coordinated with a time which is convenient based on accounting schedules.

Thus, it may be advantageous to provide a system which allows for updates on a random or asynchronous basis. Additionally, information in the form of projections is often based on judgment. Thus, it may be advantageous to provide a system in which changes may be made to information based on judgments made after input of such information. Moreover, some information (datapoints) may have particular significance. Thus, it may be advantageous to provide a system in which a user may be notified of changes to particular datapoints.

SUMMARY

The present invention is described and illustrated in conjunction with systems, apparatuses and methods of varying scope. In addition to the aspects of the present invention described in this summary, further aspects of the invention will become apparent by reference to the drawings and by reading the detailed description that follows. A method and apparatus for forecasting data with real-time updates is described.

In one embodiment, the invention is a system. The system includes an analysis server including an OLAP cube. The system also includes an information database coupled to the analysis server to support the OLAP cube. The information database is to embody forecast data as updated in essentially real-time.

In an alternate embodiment, the invention is a system. The system includes a first client. The system also includes an analysis server coupled to the first client. The system further includes a first customer database of information coupled to the analysis server. The database is to embody forecast data as updated in essentially real-time.

In another alternate embodiment, the invention is a method of maintaining information. The method includes receiving a set of forecast data. The method also includes incorporating the forecast data into a database of the information through an OLAP cube. The method further includes extracting a baseline forecast from the database. Additionally, the method includes receiving updates to the database. Moreover, the method includes propagating updates almost immediately throughout the information through the OLAP cube.

The present invention is exemplified in the various embodiments described, and is limited in spirit and scope only by the appended claims.

BRIEF DESCRIPTION OF THE DRAWINGS

The present invention is illustrated in various exemplary embodiments and is limited in spirit and scope only by the appended claims.

FIG. 2 illustrates information for a sales person in one embodiment.

FIG. 3 illustrates information for a customer in one embodiment.

FIG. 4 illustrates information for a region in one embodiment.

FIG. 5 illustrates information for a larger region in one embodiment.

FIG. 6 illustrates information for worldwide operations of a company in one embodiment.

FIG. 13 illustrates display by product of information in an embodiment.

FIG. 14 illustrates display by customer of information in an embodiment.

FIG. 17 illustrates an inventory report for information in an embodiment.

FIG. 18 illustrates a gap report for information in an embodiment.

FIG. 20 illustrates an updated forecast in an embodiment.

FIG. 23 further illustrates application of judgment in an embodiment.

Like reference symbols in the various drawings indicate like elements.

DETAILED DESCRIPTION

The present invention is described and illustrated in conjunction with systems, apparatuses and methods of varying scope. In addition to the aspects of the present invention described in this summary, further aspects of the invention will become apparent by reference to the drawings and by reading the detailed description that follows. A method and apparatus for forecasting data with real-time updates is described. In general, the method and apparatus relate to gathering forecast data from a variety of sources, developing a baseline forecast from the gathered data, and updating the baseline forecast based on essentially real-time changes in data as gathered from the variety of sources and other data sources. Moreover, the method and apparatus allow for viewing of forecast data with updates and may allow for simulation or alteration of the data.

In one embodiment, the invention is a system. The system includes an analysis server including an OLAP cube. The system also includes a information database coupled to the analysis server to support the OLAP cube. The information database is to embody forecast data as updated in essentially real-time.

In an alternate embodiment, the invention is a system. The system includes a first client. The system also includes an analysis server coupled to the first client. The system further includes a first customer database of information coupled to the analysis server. The database is to embody forecast data as updated in essentially real-time.

In another alternate embodiment, the invention is a method of maintaining information. The method includes receiving a set of forecast data. The method also includes incorporating the forecast data into a database of the information through an OLAP cube. The method further includes extracting a baseline forecast from the database. Additionally, the method includes receiving updates to the database. Moreover, the method includes propagating updates almost immediately throughout the information through the OLAP cube.

Figure 1:
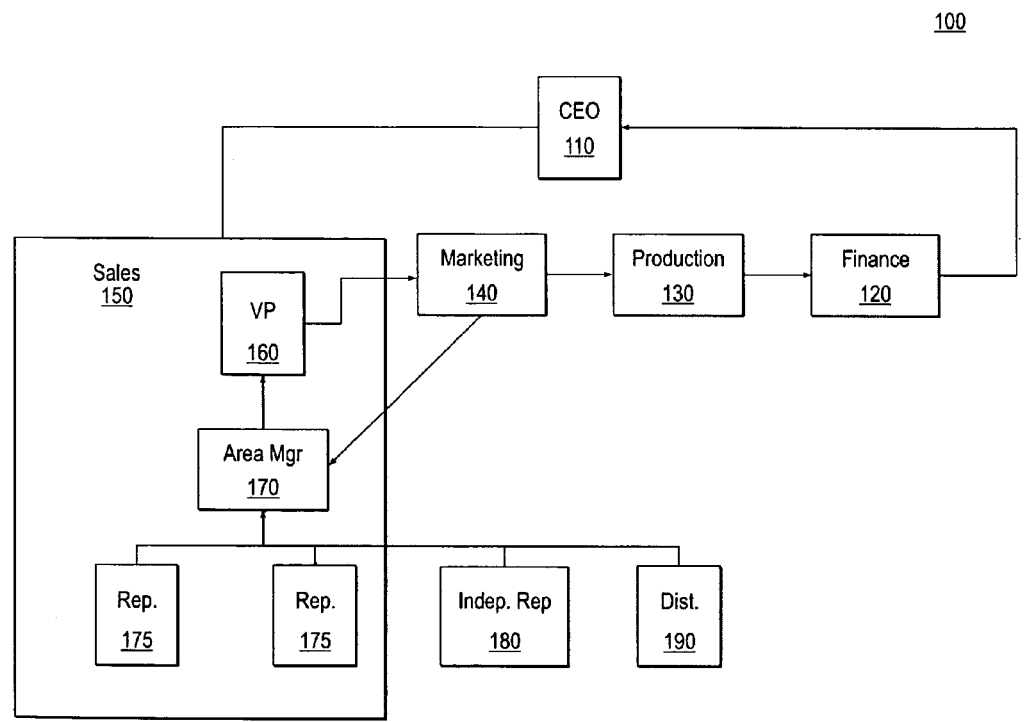
FIG. 1 illustrates information flowing through an organization.

FIG. 1 illustrates information flowing through an organization. Organization 100 may be typical of companies or other organizations concerned with finances. CEO 110 needs financial information as a basic part of the job. Sales organization 150 is thus asked to prepare a forecast of sales. This forecast may span months or years for example. Examples illustrated are for 6 months, but other time periods may fit circumstances in various situations. Other forecasts may be requested within an organization within the spirit and scope of the present invention. For example, forecasts of inventory or expenses may be prepared and tracked in real-time.

Within sales organization 150, sales representatives 175 provide forecasts of their upcoming sales. Similarly, independent representative 180 and distributor 190 provide forecasts of upcoming sales. Area manager 170 receives these forecasts, and passes them up to vice president of sales 160. VP 160 then passes the forecasts to marketing department 140. At this point, and at previous links, feedback or analysis of the financial data (forecasts) may occur, such as through changes to estimates, requests for information about or verification of data, or other forms of feedback or analysis.

Marketing 140 then sends current data to production 130 (engineering and manufacturing for example). Production 130 may comment and provide changes based on manufacturing considerations (such as delays or stockpiles for example) and then pass the information to finance 120. Finance department 120 may comment and provide changes based on financial considerations, such as availability of capital or status of accounts (such as past due accounts for example). Finance department 120 then passes the updated forecast data to CEO 110 as a baseline forecast.

CEO 110 may use this baseline for managerial analysis and for reference when speaking to non-members of the organization, such as news media outlets, customers, vendors and regulators for example. With a static forecast, the data may be stale by the time CEO 110 sees it. With real-time updates, CEO 110 may rely more effectively on available data to analyze and comment on the organization's financial situation.

To illustrate in further detail the forecasting and update process, reference may be made to how data is provided initially. Again, the process is presented in terms of sales data, but data of various types may be forecasted and tracked in real-time. FIG. 2 illustrates information for a sales person in one embodiment. The information is entered and/or displayed through user interface 200. Field or frame 260 is a display of information for the sales person 220. As illustrated, this is a display in currency (such as dollars for example) for a salesperson 220 including a company 230, a part 240 for that company, details 245 for the part 240, and another part 250 for which details are not presently selected. Field or frame 260 is a user interface for products sold by salesperson 220 which allows for entry of forecast data related to specific products for the salesperson 220.

In one embodiment, a sales representative or similar individual (user) enters information into each cell in frame 260, and is required to "touch" each cell (enter or confirm data in the cell) to attempt to verify that no data is inadvertently left out or entered incorrectly. Moreover, the user may be required to touch each cell of the summary data of part 270. Additionally, status information related to what is being entered is displayed as status 205, and submit 210 and exit 215 buttons are provided for submission of entered data and exit of the software respectively. Once data has been entered, a similar user interface may be used to display the data. If changes are made to the data, those changes may also be displayed as described below.

As illustrated, a similar user interface 300 may be used for display of information once it is entered. FIG. 3 illustrates information for a customer in one embodiment. Interface 300 provides a forecast overview, impact messages, top 10 customers, and navigation tools. Forecast display 310 provides information about a particular sales representative (for all sales people) in one embodiment. The information is displayed in a cell format, with sales people separated by row and columns devoted to time periods. Display 360 indicates what is being displayed, in this case a representative sales inc. In the NE USA part of the EAST USA region. Moreover, selector 365 determines the format of the display 310, in this case a summary, time selector 370 determines the displayed time period, and type selector 375 determines the type of display, such as dollars or units. Additionally, display 310 provides for user selection of a method of viewing (by months as illustrated) and a type of view (table as illustrated).

Another part of the display is the impacts message display 315, which provides messages about impacts to a projection based on changes. Still another part of the display is top 10 customers display 305, which may be used to provide forecasts on the top 10 customers in real time, regardless of what else is displayed. Additionally, status and navigation tools are provided. Forecast button 335 leads to the displayed forecast data. Drill down button 330 allows a user to delve into details of an entry of a subset of displayed data. Settings button 325 allows the user to change settings of the display. Help button 320 allows the user to access online help and potentially to access help over a network for example. Identity 345 displays an identity of the current user, and projection status 340 displays the status of the projection (such as whether it needs to be approved or it is active and will provide updates). Moreover, logout button 355 and home button 350 allow for exiting the system or navigating to a predetermined home part of the system respectively.

With information from users related to various customers and areas, an overview of a broader area may be provided. FIG. 4 illustrates information for a region in one embodiment. By navigating to a different region, or a region encompassing the previously displayed data for example, information for a region may be displayed. In this example, the display of frame 310 now provides data for SALES INC., As the data for the NE USA region. Display 360 indicates what region is displayed. Note that the data displayed for SALES INC. Is an aggregation of the data displayed in FIG. 3, as this is essentially displaying data at a higher level of abstraction or a different level of organization from the data of FIG. 3.

Aggregation of data for larger regions may similarly proceed. FIG. 5 illustrates information for a larger region in one embodiment. Display 310 now provides data for the NE USA and SE USA regions, with the NE USA region aggregating the SALES INC. Data of FIG. 4. Similarly, the SE USA region aggregates appropriate data. As may be expected, display 360 indicates what is being displayed, in this case the EAST USA area.

As one may expect, aggregation may ultimately go to a worldwide level. FIG. 6 illustrates information for worldwide operations of a company in one embodiment. User interface 300 now provides data on a worldwide basis, with an indication of what area is displayed in display 360. In particular, display 310 provides data for EAST USA, WEST USA, and ASIA PACIFIC regions. The EAST USA data is an aggregation of the data of FIG. 5. Moreover, as illustrated, no changes have been made to the information. Additionally, the display 310 allows for display by area or entity (tab 380), by customer (tab 385), and by product (tab 390). However, having gathered the information and displayed it, it may be useful to manipulate the information, such as by various users over a network using individual clients or workstations for example.

Figure 7:
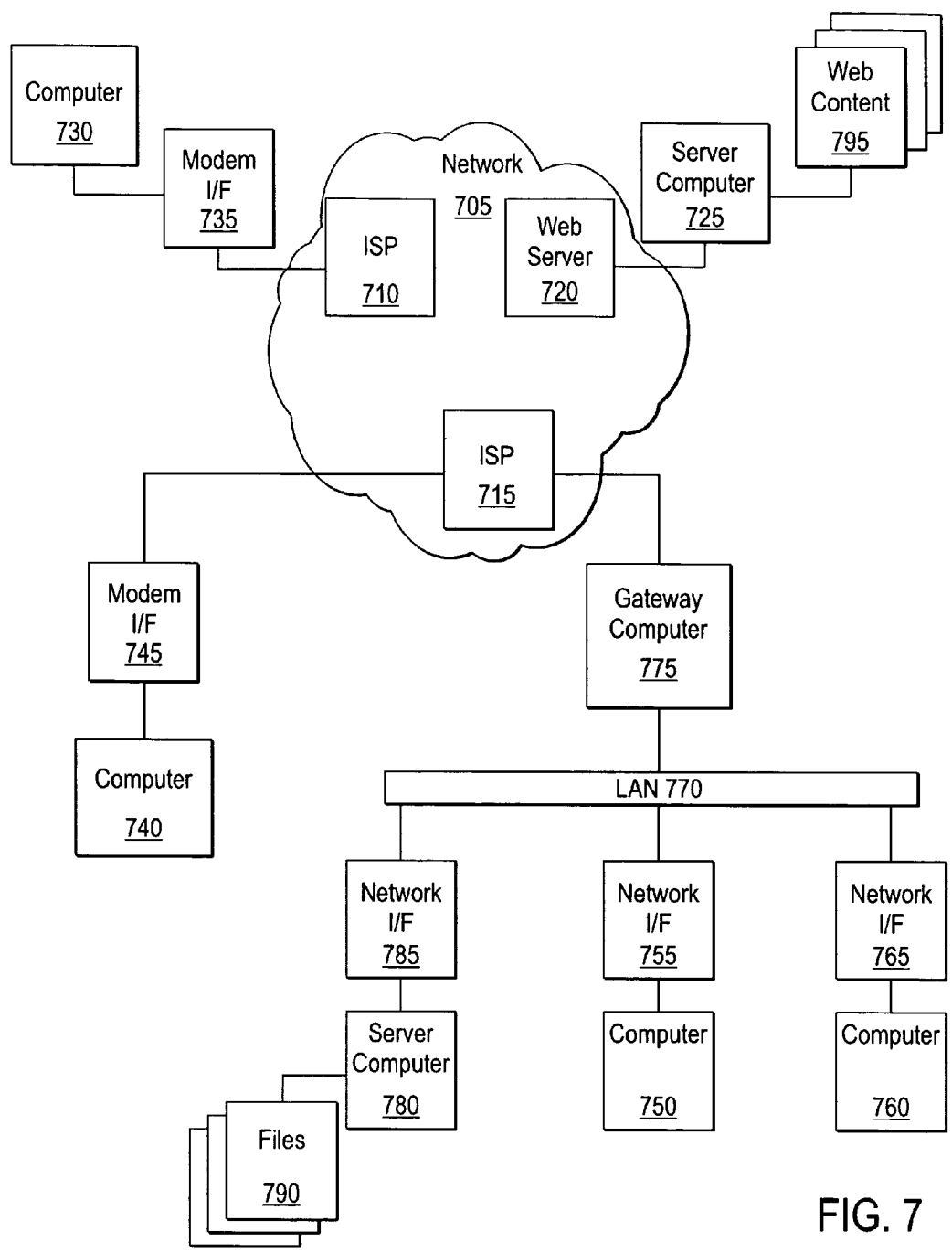
FIG. 7 illustrates an embodiment of a network which may be used in conjunction with forecasting data with real-time updates.
Figure 8:
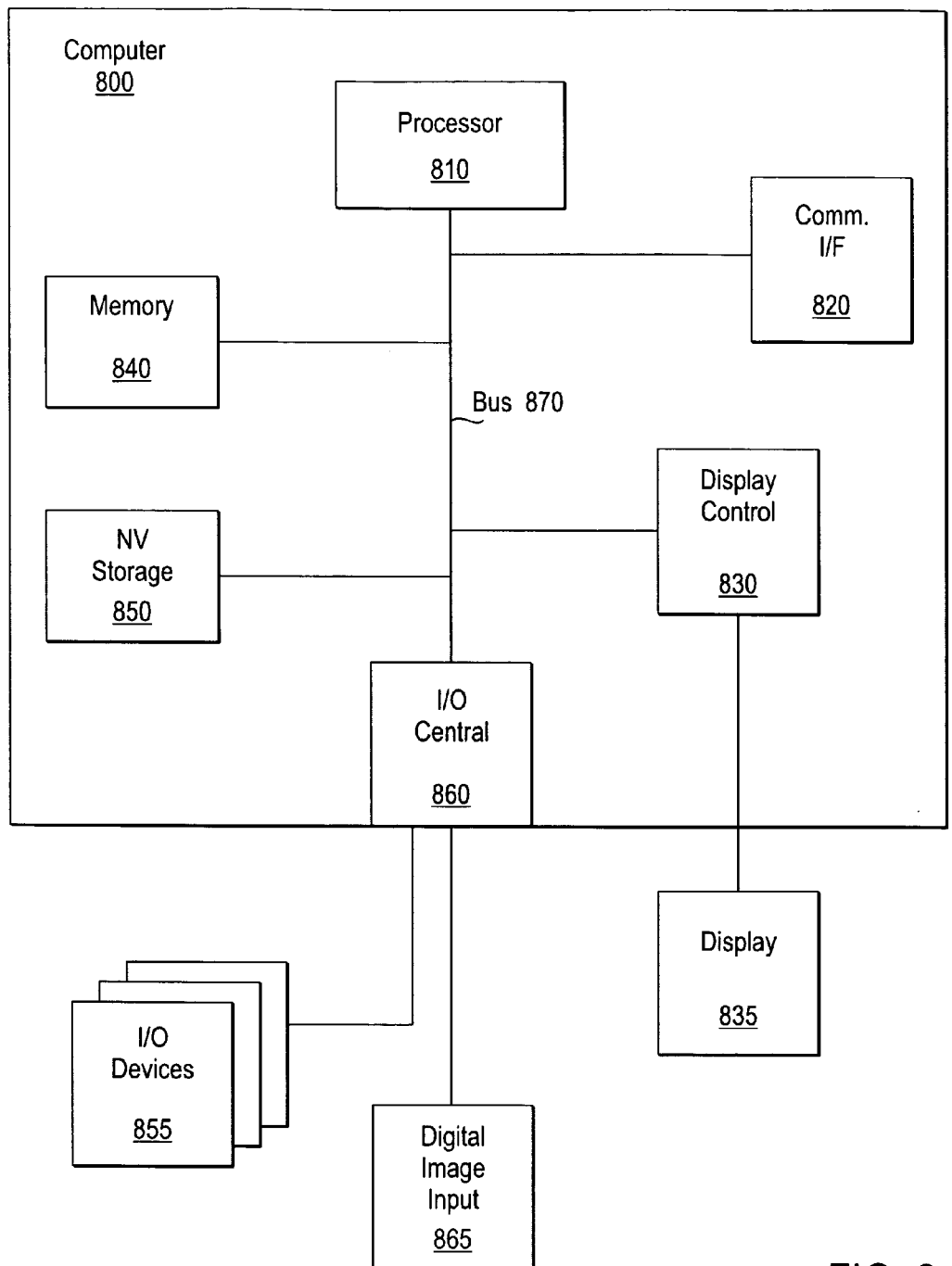
FIG. 8 illustrates an embodiment of a machine which may be used in conjunction with forecasting data with real-time updates.

The following description of FIGS. 7-8 is intended to provide an overview of computer hardware and other operating components suitable for performing the methods of the invention described above and hereafter, but is not intended to limit the applicable environments. Similarly, the computer hardware and other operating components may be suitable as part of the apparatuses of the invention described above. The invention can be practiced with other computer system configurations, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 7 shows several computer systems that are coupled together through a network 705, such as the internet. The term "internet" as used herein refers to a network of networks which uses certain protocols, such as the tcp/ip protocol, and possibly other protocols such as the hypertext transfer protocol (HTTP) for hypertext markup language (HTML) documents that make up the world wide web (web). The physical connections of the internet and the protocols and communication procedures of the internet are well known to those of skill in the art.

Access to the internet 705 is typically provided by internet service providers (ISP), such as the ISPs 710 and 715. Users on client systems, such as client computer systems 730, 740, 750, and 760 obtain access to the internet through the internet service providers, such as ISPs 710 and 715. Access to the internet allows users of the client computer systems to exchange information, receive and send e-mails, and view documents, such as documents which have been prepared in the HTML format. These documents are often provided by web servers, such as web server 720 which is considered to be "on" the internet. Often these web servers are provided by the ISPs, such as ISP 710, although a computer system can be set up and connected to the internet without that system also being an ISP.

The web server 720 is typically at least one computer system which operates as a server computer system and is configured to operate with the protocols of the world wide web and is coupled to the internet. Optionally, the web server 720 can be part of an ISP which provides access to the internet for client systems. The web server 720 is shown coupled to the server computer system 725 which itself is coupled to web content 795, which can be considered a form of a media database. While two computer systems 720 and 725 are shown in FIG. 7, the web server system 720 and the server computer system 725 can be one computer system having different software components providing the web server functionality and the server functionality provided by the server computer system 725 which will be described further below.

Client computer systems 730, 740, 750, and 760 can each, with the appropriate web browsing software, view HTML pages provided by the web server 720. The ISP 710 provides internet connectivity to the client computer system 730 through the modem interface 735 which can be considered part of the client computer system 730. The client computer system can be a personal computer system, a network computer, a web tv system, or other such computer system.

Similarly, the ISP 715 provides internet connectivity for client systems 740, 750, and 760, although as shown in FIG. 7, the connections are not the same for these three computer systems. Client computer system 740 is coupled through a modem interface 745 while client computer systems 750 and 760 are part of a LAN. While FIG. 7 shows the interfaces 735 and 745 as generically as a "modem," each of these interfaces can be an analog modem, isdn modem, cable modem, satellite transmission interface (e.g. "direct PC"), or other interfaces for coupling a computer system to other computer systems.

Client computer systems 750 and 760 are coupled to a LAN 770 through network interfaces 755 and 765, which can be ethernet network or other network interfaces. The LAN 770 is also coupled to a gateway computer system 775 which can provide firewall and other internet related services for the local area network. This gateway computer system 775 is coupled to the ISP 715 to provide internet connectivity to the client computer systems 750 and 760. The gateway computer system 775 can be a conventional server computer system. Also, the web server system 720 can be a conventional server computer system.

Alternatively, a server computer system 780 can be directly coupled to the LAN 770 through a network interface 785 to provide files 790 and other services to the clients 750, 760, without the need to connect to the internet through the gateway system 775.

FIG. 8 shows one example of a conventional computer system that can be used as a client computer system or a server computer system or as a web server system. Such a computer system can be used to perform many of the functions of an internet service provider, such as ISP 710. The computer system 800 interfaces to external systems through the modem or network interface 820. It will be appreciated that the modem or network interface 820 can be considered to be part of the computer system 800. This interface 820 can be an analog modem, isdn modem, cable modem, token ring interface, satellite transmission interface (e.g. "direct PC"), or other interfaces for coupling a computer system to other computer systems.

The computer system 800 includes a processor 810, which can be a conventional microprocessor such as an Intel pentium microprocessor or Motorola power PC microprocessor. Memory 840 is coupled to the processor 810 by a bus 870. Memory 840 can be dynamic random access memory (dram) and can also include static ram (sram). The bus 870 couples the processor 810 to the memory 840, also to non-volatile storage 850, to display controller 830, and to the input/output (I/O) controller 860.

The display controller 830 controls in the conventional manner a display on a display device 835 which can be a cathode ray tube (CRT) or liquid crystal display (LCD). The input/output devices 855 can include a keyboard, disk drives, printers, a scanner, and other input and output devices, including a mouse or other pointing device. The display controller 830 and the I/O controller 860 can be implemented with conventional well known technology. A digital image input device 865 can be a digital camera which is coupled to an i/o controller 860 in order to allow images from the digital camera to be input into the computer system 800.

The non-volatile storage 850 is often a magnetic hard disk, an optical disk, or another form of storage for large amounts of data. Some of this data is often written, by a direct memory access process, into memory 840 during execution of software in the computer system 800. One of skill in the art will immediately recognize that the terms "machine-readable medium" or "computer-readable medium" includes any type of tangible storage device or medium that is accessible by the processor 810 of a machine or computer.

The computer system 800 is one example of many possible computer systems which have different architectures. For example, personal computers based on an Intel microprocessor often have multiple buses, one of which can be an input/output (I/O) bus for the peripherals and one that directly connects the processor 810 and the memory 840 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 840 for execution by the processor 810. A Web TV system, which is known in the art, is also considered to be a computer system according to the present invention, but it may lack some of the features shown in FIG. 8, such as certain input or output devices. A typical computer system will usually include at least a processor, memory, and a bus coupling the memory to the processor.

In addition, the computer system 800 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. Another example of an operating system software with its associated file management system software is the Linux operating system and its associated file management system. The file management system is typically stored in the non-volatile storage 850 and causes the processor 810 to execute the various acts required by the operating system to input and output data and to store data in memory, including storing files on the non-volatile storage 850.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-roms, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

Figure 9:
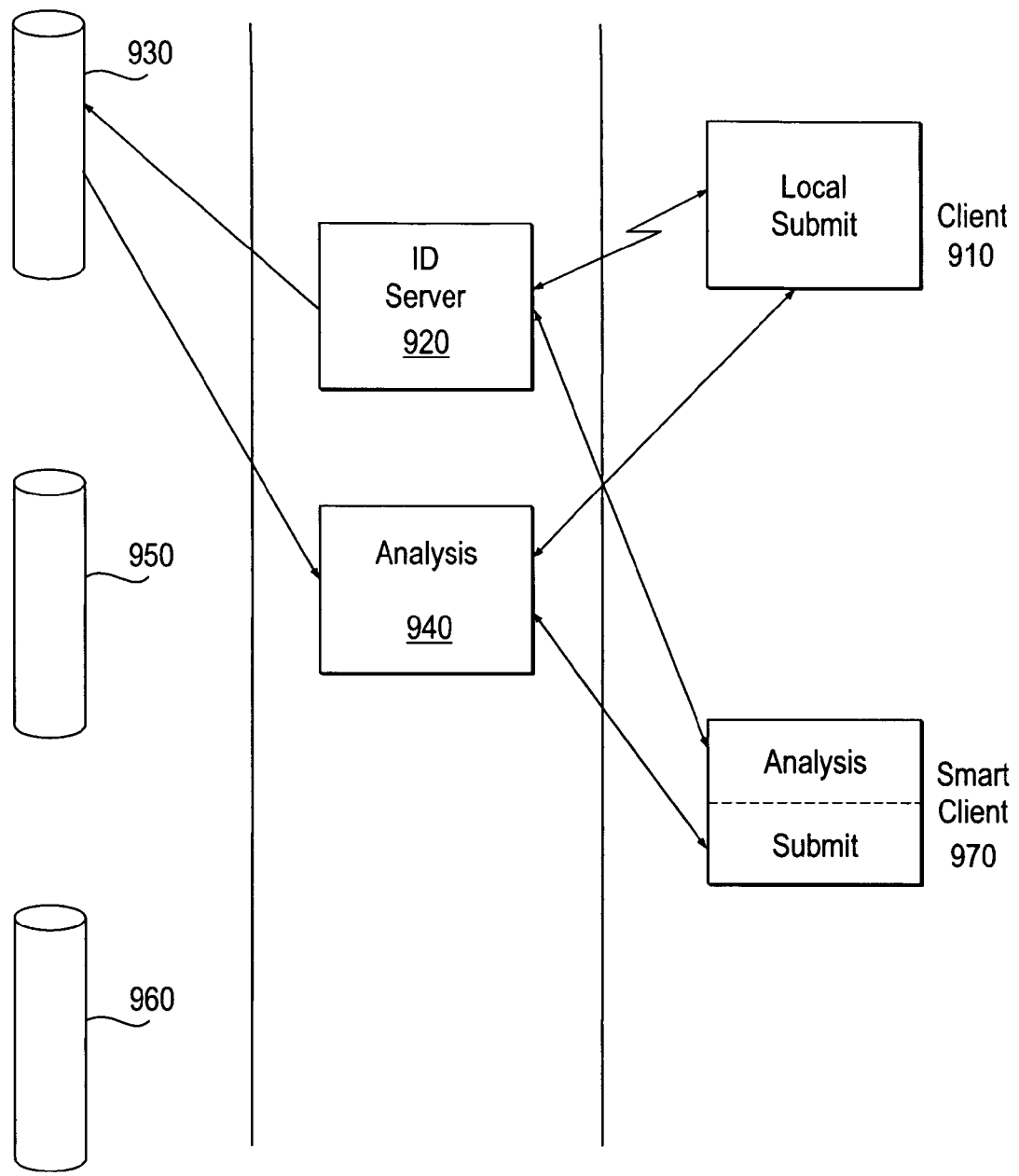
FIG. 9 illustrates an embodiment of a system for use in forecasting data with real-time updates.

Various networks and machines such as those illustrated in FIGS. 7 and 8 may be utilized. FIG. 9 illustrates an embodiment of a system for use in forecasting data with real-time updates. System 900 includes clients, servers, and supporting databases. Various embodiments of systems may be used, with different configurations as needed due to circumstances surrounding an implementation or installation of such a system. The system 900 may be used with various types of data which is suitable for both forecasting and for essentially real-time updates. Essentially real-time updates refer to updates provided to the system as soon as practicable—this may be immediate, or it may occur as soon as a person with the appropriate information is in a position to relay that information to the system 900.

System 900 includes a client portion, with clients 910 and 970, a server portion with identification server 920 and analysis server 940, and a database portion with databases 930, 950 and 960. In one embodiment, databases 930, 950 and 960 are each dedicated to specific customers (such as a first customer, second customer and third customer). Identification or authentication server 920 received access requests from various clients such as clients 910 and 970. Server 920 then authenticates or identifies the client(s) and current users to determine which database (if any) should be accessible. Analysis server 940 then starts receiving requests from the clients, allowing for analysis of data in the selected database.

Authentication and access may be handled in various ways. For example, once a client (client 910 for example) is authenticated, it may be redirected to the analysis server 940 with something such as a token which encodes an address for server 940 and information about which database (such as 930) to use. Alternatively, client 910 may receive a key (such as a portion of a public key-private key pair for example), which may be used to access a previously known address for server 940 (the key may enable a response for example). The key may also be required to be transmitted from server 940 to database 930 to access data, for example.

Analysis server 940 may be implemented in part using an OLAP cube. OLAP cubes are available from various commercial entities, such as microsoft corp. of redmond, Wash., for example. An OLAP cube may perform automated analysis of data when supported by a database such as database 930 for example, allowing for fast throughput of data and fast propagation of changes. In one embodiment, all analysis occurs at server 940, as client 910 is a local client used only to submit information and queries and to view information in the user interface. In another embodiment, client 970 is a smart client which incorporates some analysis capabilities (such as through a local OLAP cube and repository for example). Client 970, as a smart client, can then be operated in isolation from the network and server 940, while still allowing for analysis and display of data actually stored or replicated at client 970.

Figure 10:
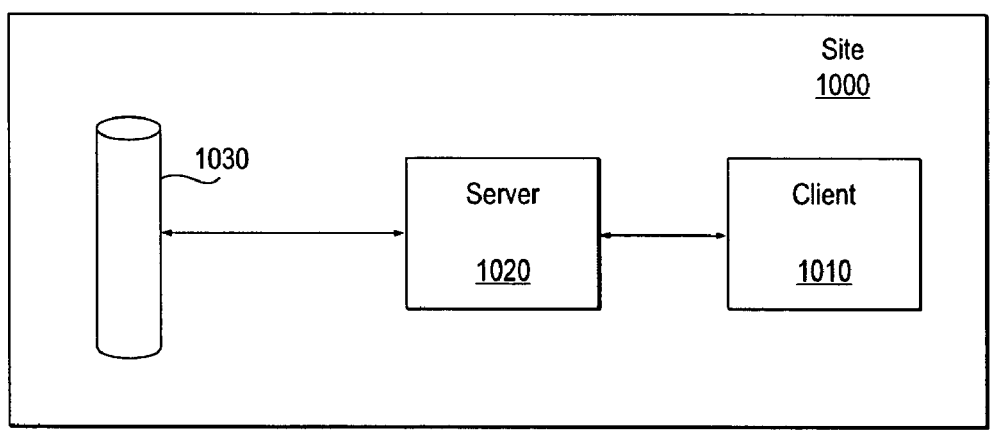
FIG. 10 illustrates an alternate embodiment of a system for use in forecasting data with real-time updates.

As illustrated, FIG. 9 reflects a system which may be distributed geographically and organizationally, thus allowing for revenue generation based on access to and maintenance of the system for example. FIG. 10 illustrates an alternate embodiment of a system for use in forecasting data with real-time updates. Site 1000 includes a client 1010 (potentially many clients), a server 1020 and a database 1030. As the system is self-contained, authentication may or may not be needed (site 1000 may be restricted to authorized users for example). Client 1010 may be implemented as a local client without analytical capabilities, or as a smart client, and server 1020 may be implemented for analysis with an OLAP cube for example.

Figure 11:
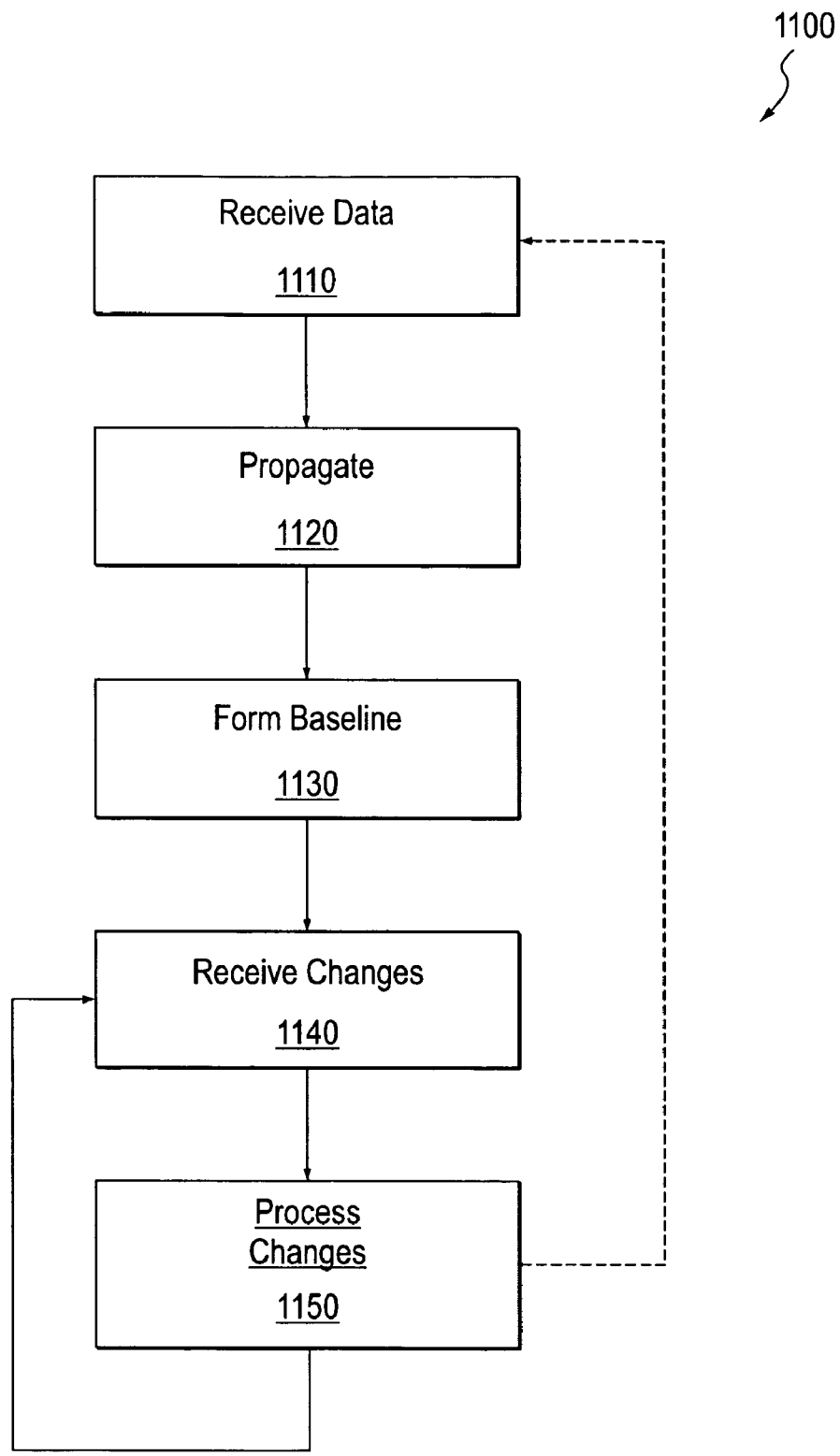
FIG. 11 illustrates an embodiment of a method for use in forecasting data with real-time updates.

How the systems and other embodiments operate may vary. FIG. 11 illustrates an embodiment of a method for use in forecasting data with real-time updates. The method (1100) and other methods of this document are illustrated as a set of process modules which may be rearranged and may be performed or operated in a parallel or series manner, for example. At module 1110, data is received, such as financial data for an initial forecast. At module 1120, the data is propagated in the system (such as in an OLAP cube or supporting database). At module 1130, a forecast baseline is formed, such as due to arriving at a deadline or due to a determination that enough data has been collected for example.

With the baseline available, some information about the forecast may change, and other information may remain static. At module 1140, changes are received. At module 1150, the received changes are propagated or processed, with updates propagating through the system, alerts or notifications being sent, and any recorded adjustments being applied as appropriate. Modules 1140 and 1150 may be executed multiple times in an iterative fashion as changes are received, thus allowing for essentially continuous and almost real-time updates. Moreover, as time comes for the next forecast (the next quarter for example), the process may return to module 1110.

Figure 12:
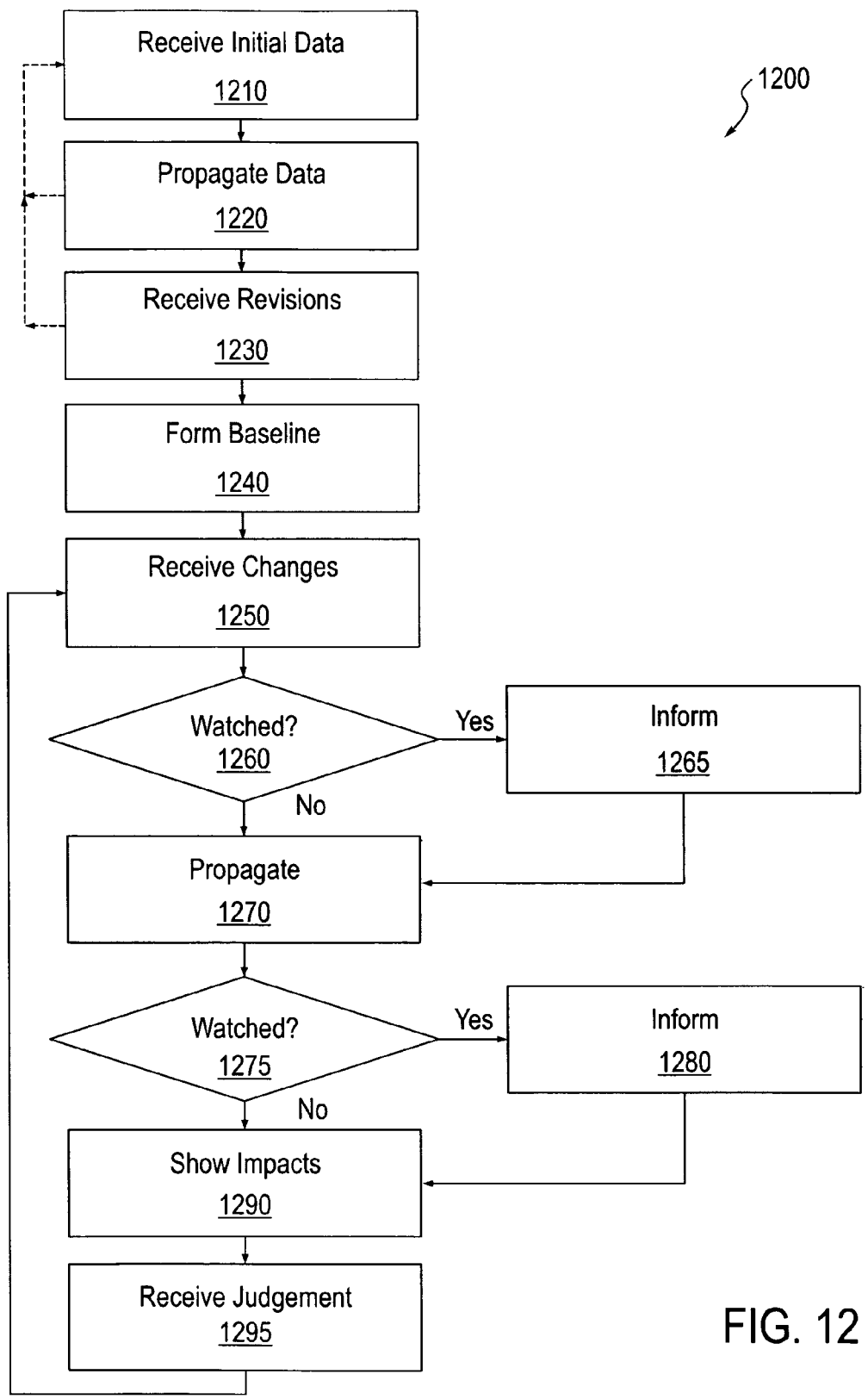
FIG. 12 illustrates an alternate embodiment of a method for use in forecasting data with real-time updates.

Specific processes may be utilized in some embodiments. FIG. 12 illustrates an alternate embodiment of a method for use in forecasting data with real-time updates. At module 1210, initial data of a forecast is received, such as raw data from sales representatives for example. At module 1220, the data received is propagated through the system. At module 1230, revisions to data, such as judgments applied to raw data leading up to a forecast are received. Such judgments may come from supervisors of sales representatives, marketing department personnel, manufacturing or engineering personnel, financial personnel, and even the CEO or other high-level personnel. Modules 1210, 1220 and 1230 may be repeated due to data arriving at different times or other variations in input cycles for example. At module 1240, the baseline is formed, with forecast data from modules 1210, 1220 and 1230.

At module 1250, changes are received, such as updates to previously forecast data. While some changes may be confirmations of forecasts (change from expectation to actual), many changes may be actual changes as orders come in at different prices, quantities and the like from forecasted data. At module 1260, a determination is made as to whether the actual changed data was watched. If so, at module 1265, notification is sent based on the watch request, with a level of detail appropriate to the request for the watch and system capabilities. At module 1270, the changes are propagated through the system, such as through an OLAP cube and/or database. At module 1275, the various datapoints that are affected are checked to determine if any of them are watched. If so, at module 1280, notification is provided based on the watch request. At module 1290, impacts to the forecast prior to receipt of the changed data are shown, preferably in a manner allowing for easy user interpretation of the data. At module 1295, judgment or adjustments are received from users responsive to the changed information, resulting in the receipt of further changes at module 1250 and so forth.

Further aspects and features of an embodiment may be understood with reference to a user interface for the embodiment and a description of how and why the interface changes. FIG. 13 illustrates display by product of information in an embodiment. As mentioned, information may be displayed by region, for example. As illustrated, display 310 provides information by product, with similar or the same information.

The display 360 indicates that this is a display by product, for all families in the illustrated example. Just as the impacts may be provided in impact display 315 for regions, they may also be provided for products, such that impacts may be displayed based on the view of the data provided in display 310. Alternatively, a user may specify that impacts are provided at a global level, or other predetermined/preselected level for that user for example.

FIG. 14 illustrates display by customer of information in an embodiment. Again, the option of displaying information in a different way is illustrated. Rather then display by either part or region, display by customer allows for a determination of which customers are increasing orders, decreasing orders, or experiencing short-term changes for example. As the data is preferably stored with associations to customers, parts, regions, sales persons, and other relevant information, displaying the data in various different ways becomes possible. Moreover, as the data populates an OLAP cube, shifting between displays involves simply shifting from displaying one aspect of the information as it is maintained in the OLAP cube to displaying a different aspect of the information as it is already maintained in the OLAP cube. Note that the data may be displayed responsive to selecting the tab 385 (marked customers) and that display 360 indicates how the data is viewed.

Figure 15:
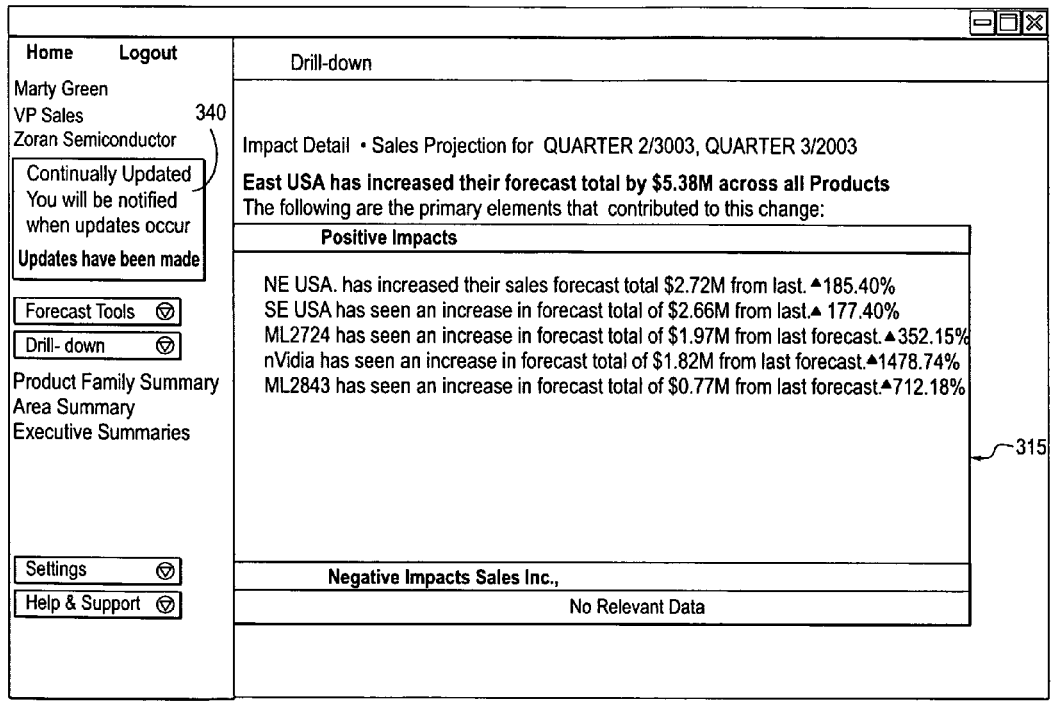
FIG. 15 illustrates display of a specific impact in an embodiment.

As illustrated above, the data in FIG. 13 and FIG. 14 is displayed before a forecast is compiled into a baseline. However, changes in data may occur at any time, particularly after the baseline is formed. FIG. 15 illustrates display of a specific impact in an embodiment. Impacts are translations into human understandable language (such as english for example) of changes in data as propagated through the system. In the instance illustrated, impacts display 315 is expanded to allow for closer examination of the impacts reported. Moreover, one may drill down into the impacts, to determine how the impacts came about or what the source of the impact is. Additionally, impacts may occur before, during or after formation of a baseline forecast. Thus, status indicator 340 indicates these impacts are being viewed after a forecast has been accepted (or after the user no longer has options for input), and further indicates that continuous updates will be received.

Figure 16:
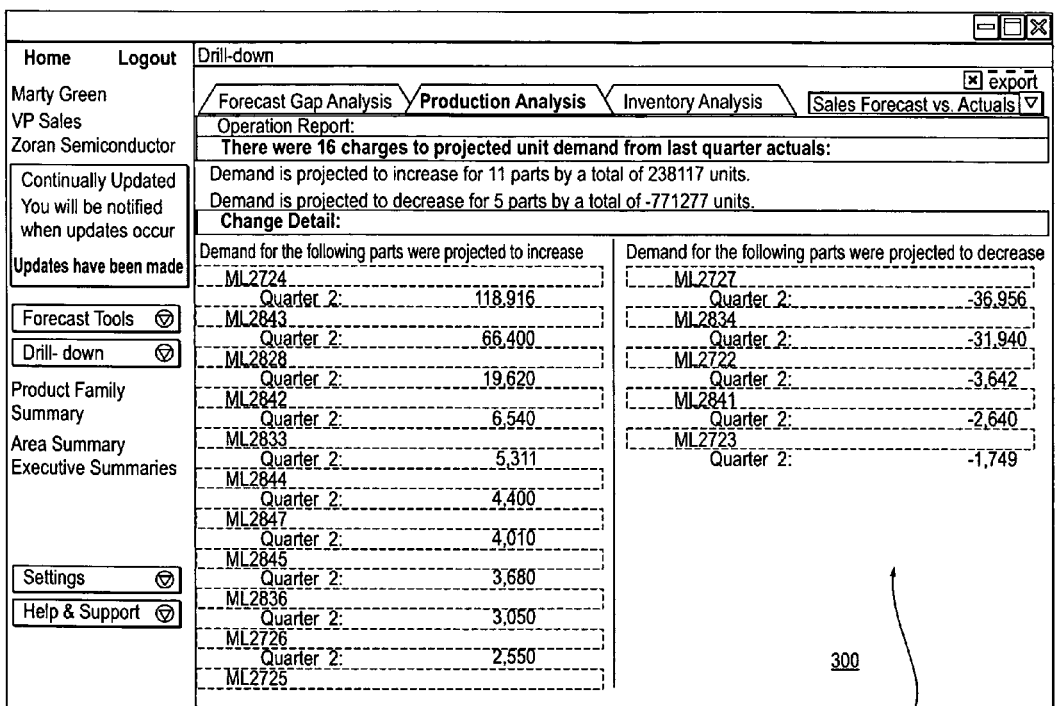
FIG. 16 illustrates an operations report for information in an embodiment.

Other presentations of the data are also available. FIG. 16 illustrates an operations report for information in an embodiment. Operations display 405 provides a view of the data based on an operational or manufacturing viewpoint, with information about changes in demand or absolute demand quantities illustrated and a summary of changes as well. Again, drilling down may also be an option, such that demand for a part may be broken down into when the demand will occur or why the changes are occurring.

FIG. 17 illustrates a forecasted change to inventory report for information in an embodiment. Unlike the view in operations display 405 of FIG. 16, the inventory report illustrated in operations display 405 focuses more on monetary value of the change impact of forecast updates, with both a summary and detailed information. Such a report may also be provided for services based on capacity to fulfill demand and actual demand.

Likewise, a gap report may also be provided in operations display 405. FIG. 18 illustrates a gap report for information in an embodiment. The gap report may provide a view of variances between a projection and current actual numbers, and thus indicate what orders need to happen to ensure that the company delivers on its expected forecast.

Figure 19:
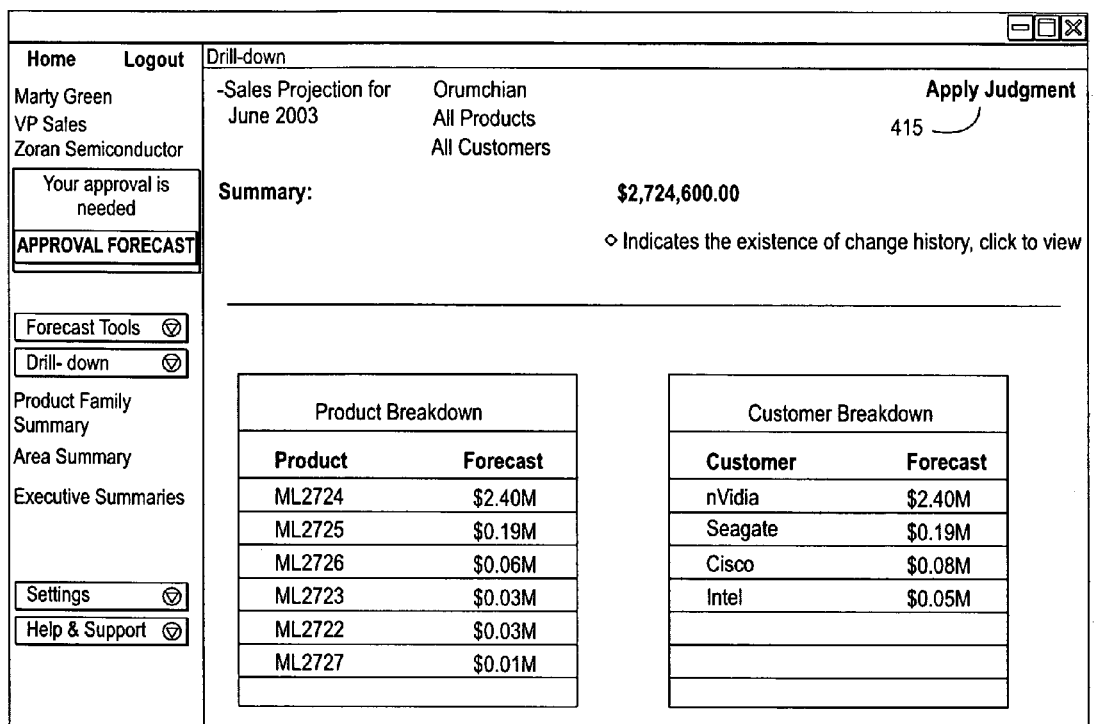
FIG. 19 illustrates a drilled down display of information for a sales person in one embodiment.

Drilling down is typically available, unless a user is restricted from such an action. FIG. 19 illustrates a drilled down display of information for a sales person in one embodiment. Based on an earlier projection, data for a single sales person may be displayed by drilling down on a display of data for multiple sales people (such as was found in FIG. 3 for example). Drill-down display 410 provides the details of the data making up the entry for one sales person. Moreover, if the user has authority to do so, apply judgment button 415 allows for entry of judgment about whether the forecast is accurate, or how it needs to change. This will be described further below.

Updates may occur while someone is viewing data such as drilled-down data, or when a user is offline. FIG. 20 illustrates an updated forecast in an embodiment. Note that changes may have occurred in the forecast for various reasons. The display 310 provides summary data, with some of the data flagged by balls indicating changes in the forecast. Such changes may be the result of applications of judgment (post-forecast) or of actual changes to forecasted data based on real-time updates. Impacts display 315 may provide further information in some instances, such as when an actual change provides an impact.

Figure 21:
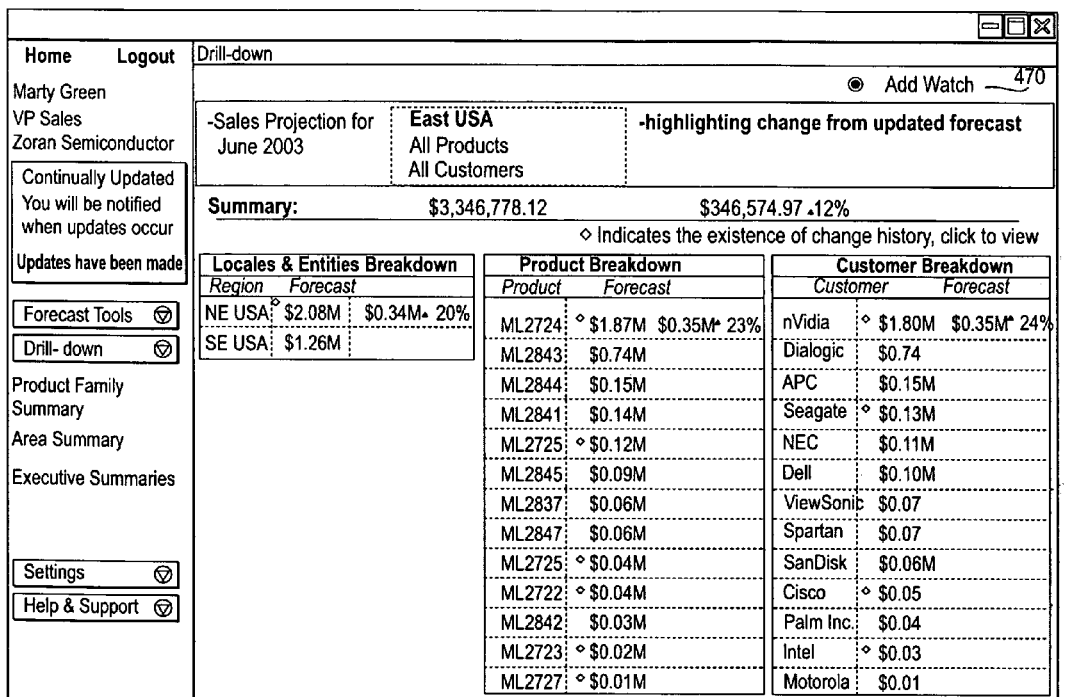
FIG. 21 illustrates a drilled down display of a region in an embodiment.

In pursuing information about updates, one may view drilled-down data and corresponding changes or information. FIG. 21 illustrates a drilled down display of a region in an embodiment. Drill-down display 425 presents data specific to the region selected in this illustration, such as sub-region-specific, part-specific and customer-specific information. Thus, drill-down display 425 may present a different view from that provided in display 310 for example. Moreover, add watch button 420 allows a user to watch a given data point for changes, over a certain threshold, within a certain time, or otherwise, for example.

Figure 22:
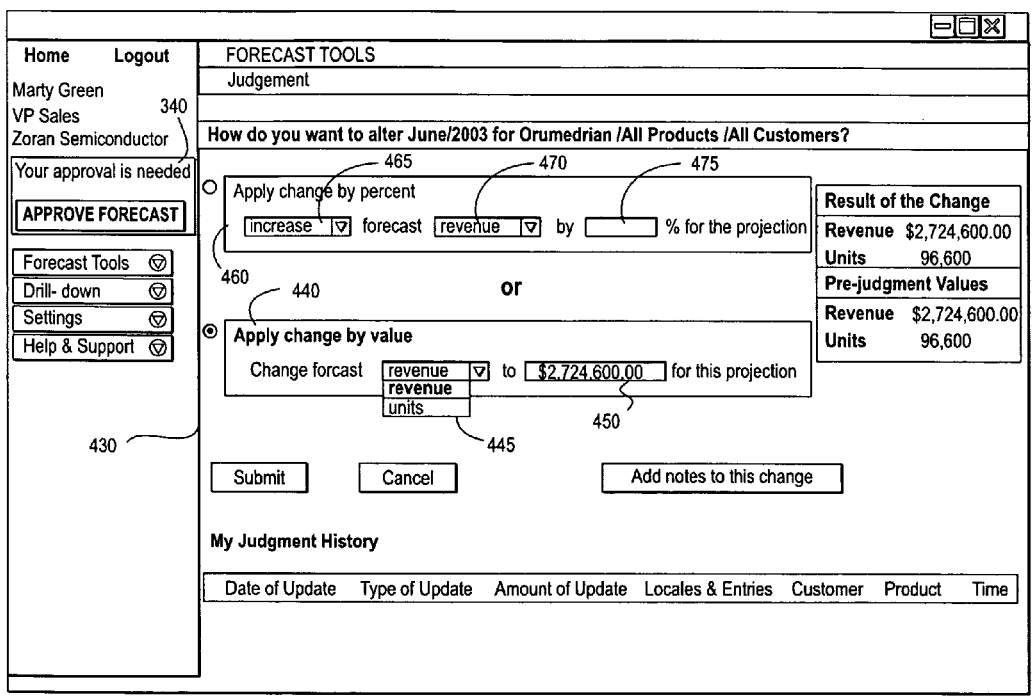
FIG. 22 illustrates application of judgment in an embodiment.

Both judgments and watches may be understood with reference to further illustrations. FIG. 22 illustrates application of judgment in an embodiment. Judgment interface 430 includes value change option 440 and percentage change option 460. Value change option 440 includes type 445. (units or revenue for example) and value 450 (amount of change for example). Percentage change option 460 includes direction 465 (increase/decrease), type 470 (revenue or units for example) and amount 475 (the amount of change for example). As illustrated, a change by value is executed, with a set amount provided—the end result of the change is specified. With a change by percentage, the amount of change (delta) is specified. Additionally, because a change judgment) is being entered, status 340 indicates that an approval must be provided for the change to take effect.

FIG. 23 further illustrates application of judgment in an embodiment. In this instance, since a judgment has already been applied, judgment history 480 is populated with an entry which is displayed. This may allow a user to avoid a redundant judgment entry, or may provide context for future applications of judgment. Again, a judgment is being entered in value change option 440, thus further changing the data in question.

Figure 24:
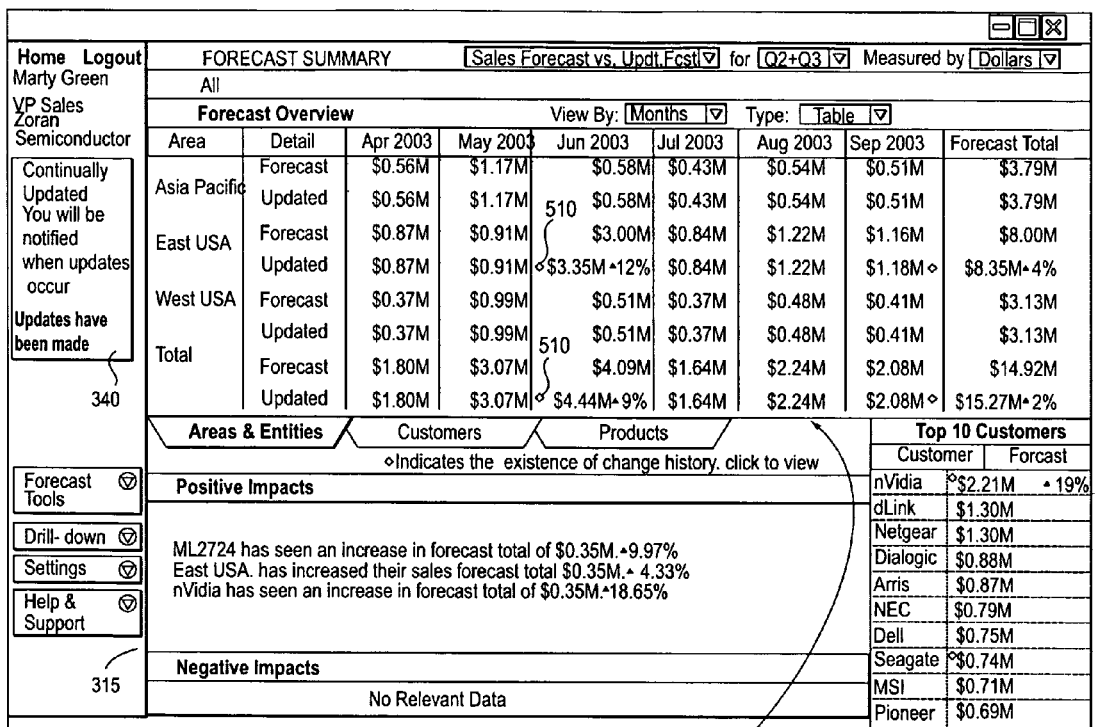
FIG. 24 illustrates a forecast after application of judgment in an embodiment.
Figure 25:
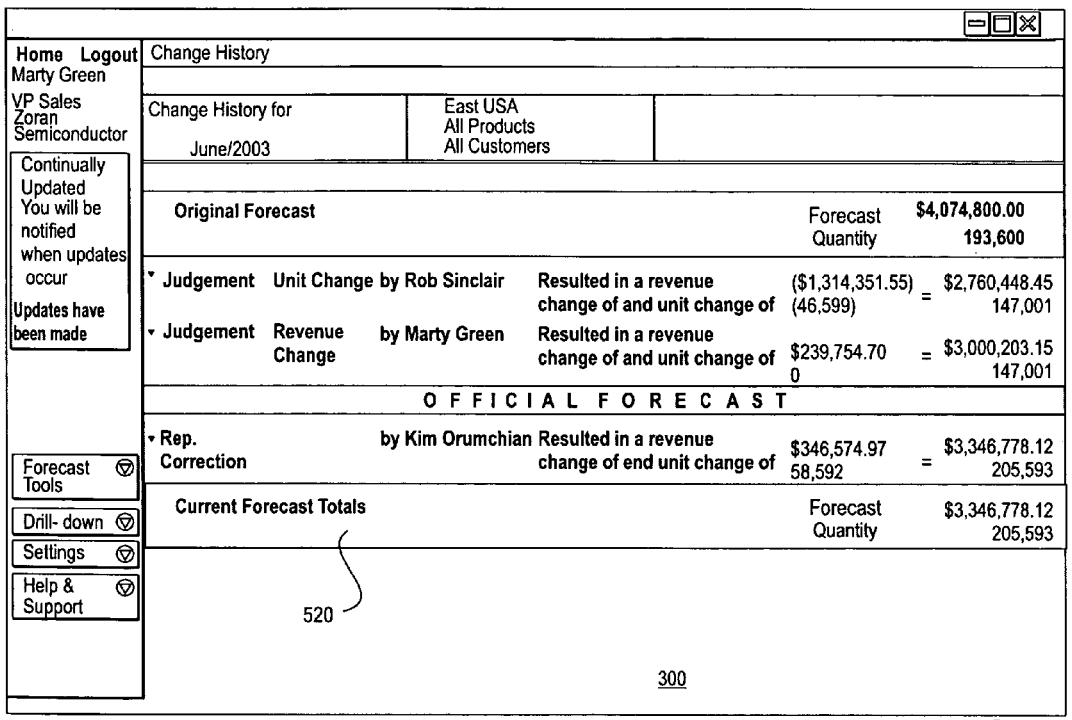
FIG. 25 illustrates change history for information in an embodiment.

FIG. 24 illustrates a forecast after application of judgment in an embodiment. With the change entered, a view of the original data provides an indication that judgment has been applied. In particular, judgment indicator balls 510 are now present, indicating the presence of judgment history associated with the displayed data or with data aggregated into the displayed data. As one may expect, drilling down to the changed data will allow one to see a judgment history such as history 480 of FIG. 23. FIG. 25 illustrates change history for information in an embodiment. By drilling down, or by selecting the judgment indicator ball 510, the history 520 is displayed, including information about who entered the judgment, type of change, who it affected, and the amount of the change. In the illustrated example, the sales person responded to the judgment after the forecast was made by providing a further correction.

Figure 26:
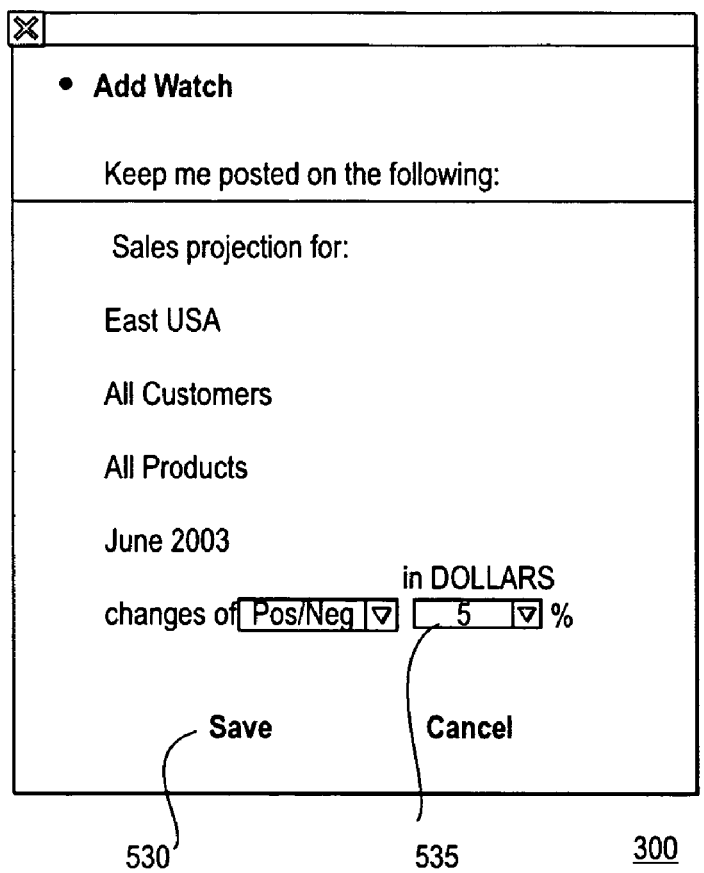
FIG. 26 illustrates addition of a watch in an embodiment.

While judgments change the forecast, watches indicate changes, either actual or forecast. FIG. 26 illustrates addition of a watch in an embodiment. Watch window 530 pops up when application of a watch is selected, and includes change type 535 in which the amount of a change to be watched for is entered. Thus, the user can control whether a very small change, a catastrophic change, or some intermediate change triggers the watch. Typically, a watch sends an email or similar message to the user setting the watch once the predetermined threshold is reached or exceeded (missed or undershot).

When data is changed from an original value to a new value, such as in response to a request to apply judgment, this may have a number of effects. This may be a change in percentage or absolute terms for example, and may result from specific expectations or information, or from general expectations (hunch, intuition, etc.) For example. The change to the data results in a propagated change to other data. Alternatively, a change could be made to other data with changes back-propagated to some or all of the data contributing to the changed data. Moreover, if a piece of data is set for watching, with notification to the user should the data change, and a change propagates through, this may trigger the watch alert. Watching may be set for any change, changes above a specified threshold, or changes before a certain date for example. Also, watches may not be required to detect changes that would be visible, such that if the display generally is in billions, a change in the thousands may be sufficient to trigger a notification.

While illustrations of changes have been provided on a high-level basis (the whole world for example), changes of unit quantities may also occur. Information for a single product may be displayed over a geographical area, rather than for a geographical area for all products for example. Information may also be displayed for a set of customers for a single product or product line, for example, or on other bases. Moreover, the information may be displayed in units of product rather than currency. Preferably, information on both a currency number and a units (quantity) number is stored. Thus, display of information in the user interface may be shifted between the two types of displays. The units may be a physical quantity (number of parts or devices for example), an estimated physical quantity (number of meals served for example), or some form of service metric (number of hours billed for example). Moreover, the various datapoints may be absolute numbers or scaled (such as quantity in thousands for example). Also, watches and judgments may be applied on a quantity basis rather than a currency basis.

Because specific products or services may be tracked, updates may be based on changes in a single order or a long-term relationship for example. A customer may decide to exit a business or discontinue a product, thus ending a need for a purchased component for example. Similarly, a vendor may decide to discontinue a product, thus requiring a customer to ramp up purchase to ensure an adequate stockpile after the component is discontinued. Such resulting updates may be a confirmation or cancellation or other change to a forecasted order, for example. Moreover, such updates may propagate further up. Additionally, any judgments may be dynamic (reduce a number by 10% always for example), or may be conditional (reduce a forecast number to x until it decreases to x). Thus, propagation may stop prior to reaching every related data point.

Further Considerations for Financial Embodiments

The following description of an exemplary system related specifically to financial data provides details of an embodiment, along with implementation details which may be incorporated in various embodiments. The features and details may be used in part in other embodiments within the spirit and scope of the present invention, and may be combined with other features and details described previously. In particular, most of the details provided are appropriate for many types of data, and are not restricted to financial data.

The system, in one embodiment, lets companies streamline the process of creating a bottom-up forecast of sales and financial data. In one embodiment, this includes collecting the data from those on the front lines. This may include receiving data from sales representatives, distributors, representative firms, customers, retailers, or other sources of forecast data. Following this, the data may be aggregated within the system, and the system may then allow sales and marketing management to apply judgment. The hierarchical judgment applications may be tracked, such as by maintaining data about judgments applied to specific data and to corresponding changes to other data. Moreover, prior to or after applying judgment, the consequences of the judgment applied may be understood, as the changes flow through the data (as implemented by the OLAP cube), and are displayed. Moreover, analytical tools may also be employed to understand the data. Examples of such tools include regression analysis, statistical analysis, data mining, and correlation analysis among other tools.

After an initial review of the data provided, a sales vice president or similar person in authority may create an official forecast baseline, preferably after the person has understood, judged and approved the data that has been rolled up to him. At this point, the person may release the data for others in the company to consume; and define the baseline against which updates will be tracked. The baseline may be yearly, quarterly, monthly, bi-weekly, weekly, even daily if desired, and may be implemented on some other time-frame. Moreover, multiple users or persons in authority may play a role in building the forecast or modifying the forecast, such as by allowing for marketing input for example. Thus, some portions of the forecast may come from marketing; marketing may apply judgment at some point in the process; or marketing may provide longer-term forecasting (in contrast to shorter-term sales forecasting) for example.

The released forecast then provides departments within the company, such as production, engineering and operations, insight into what will need to be built, both when and where. Moreover, this allow for vetting (and thus feedback) from production, and may allow for prediction of trends for parts or supplies for example. Similarly, this allows finance departments to analyze and predict financial data such as a gross margin, either on a line-by-line level or at an enterprise level, for example. This then allows for planning of capital needs and for simulation or 'what if' type of scenarios, both within the system or in a separate financial system. Additionally, finance departments can provide feedback to the baseline as well, such as by indicating which accounts are doubtful and should be discouraged until payment is more reasonable, or by indicating what expected financial trends may do to various industries.

From this, the CEO may then see all perspectives of the forecast, along with the broad overview of the forecast. This allows the CEO to obtain 'one number' for the entire company—allowing for intelligent discussions with media and outside interests when the CEO interacts with the public.

Moreover, this provides a clear and detailed view of expected developments of the company. As the CEO may also simulate changes, apply judgments or watch numbers (along with other departments and people), the CEO and staff may then analyze potential changes. As such, this facilitates key decisions a CEO may need to make. Such decisions, whether made by the CEO or some other member of the company, may include determining what parts to retire and when; how much of internal resources to allocate; where to invest based on what appears to be driving the business; how to streamline internal operations; and how to maximize capital efficiency for example.

With the baseline in place, not only analysis and feedback, but also real-time updates are available. The system may show the impact of changes if they pass a certain threshold, and show the impacts by department, group or otherwise. This then allows the company to react to external (market for example) forces, allows all groups to consider and agree on options to handle changes, and allows for a group or consensus decision on whether or not to choose specific options.

In one embodiment, the process may be described as follows:

Data collection is automated, to the extent possible. This may include sending out automated reminders to those generating the data (or inputting the data they observe for example). The users or forecasters (who may be sales people with many other demands on their time) enter data using a simple user interface which is robust enough to trap or catch common errors such as entering too many or too few zeros, unintentionally large or small changes, or incomplete data or omissions for example. Moreover, the user may be provided data to help create the right forecast. For example, a backlog may be used as a starting point, or the last forecast may be used as such a starting point. Additionally, feedback may be provided on forecast accuracy, such as by attempting to curb over-optimistic forecasts or sandbagging.

With data entered, or with a deadline approaching or past, notifications may be sent to those who are tasked with reviewing and judging the data. Notices may relate to delinquent forecasts, forecasts in and ready for approval, or problems with forecast creation for example. The system provides tools to view the data, view aggregated data (which may be viewed or drilled down to various levels), apply judgment (globally or locally for example), send forecasts back for rework/correction/reconsideration for example, and approve the forecast (and/or send to the next hierarchical level).

Preferably, the interface is simple, with controls that change global perspective (such as switching to a graphic or tabular view for example). This may further include providing comparisons to various time periods (such as a previous forecast, successive quarters, year on year comparisons, and current information versus baseline comparisons for example). Similarly, comparisons to actual sales or actual data may be provided.

Moreover, data may be shown in various forms, or with various aspects of the overall collection of data displayed, and data may be drilled down from higher to lower levels of data aggregation, ultimately to atomic data levels. Thus, data may be provided as revenue, units, gross margin currency, gross margin percentage, simple margin currency, simple margin percentage, average selling price, or in any other format either collected or derivable from collected data. Similarly, data may be sliced by various means, such as by region, customer, part (or service), or by some custom aggregation of atomic data or previously aggregated data for example. A custom aggregation may allow for display of data by program, segment or other varying groupings of data for example.

Moreover, data may be displayed based on various breakdowns. For example, users can drill into any value at any point by clicking and may then see what makes it up. Thus, users may break down data on parts, customers, or regions for example. Similarly, users can then click on any sub-entity (such as a division of a customer or a part of a region for example) to get further breakdowns.

In some embodiments, baseline creation and continuous updates form separate tasks and may have separate interfaces. Thus, a different business process may be used for each. Creating a baseline is often oriented towards a bottom-up commit—sales people providing commitments to the company for example. Creating updates is often more of a change notification prompting or requiring decisions and/or action—the biggest customer starts canceling orders and high-level executives need to act right away.

With the data stored in the system, this enables continuous updates—a change may be propagated essentially immediately. The system may immediately notify all groups to a change in terms that make the impact (of the change) clear. These groups may include sales, marketing, production, engineering, operations, finance, and executive groups for example. Moreover, the updates may be provided using a simple client or interface, and may be tied to production to ensure that sales people will get goods for their customers in the right quantities at the right times.

While continuous and essentially real-time updates provide a fairly accurate picture as changes occur, judgment may be used to predict changes, and judgment histories may be employed to determine when predicted changes occur, or whether predictions are already integrated into a forecast. Judgments may be applied hierarchically to forecast data. Thus, a judgment may be applied to a high-level number, and then changes may be cascaded or propagated to lower levels, allowing users to see the effects of the judgment.

Tracking and inspecting the history of judgments applied (by attaching judgments and judgment history to data for example) allows users to determine whether judgments should be reversed for example. Moreover, variances of actual results from judgments may be examined and analyzed. Additionally, as judgment may be applied prior to or after a baseline is formed, differences of pre-baseline versus post baseline judgment may be tracked.

While judgments allow for predictions, watches allow for action. Every user has the opportunity to design custom notifications around anything they can see from their vantage point in the system. Thus, the user may choose to watch a data point for a particular customer, part, service, time period, or other data point, as long as it is visible. The user may set a custom threshold for notification, and a users may create and save collections of watches with corresponding messages that can be turned into reports for example.

Further analysis and related judgments and watches may be applied to custom aggregations of data. Preferably, the system lets customers aggregate data in any way they choose. For example, part data may be aggregated based on programs. Customer data may be aggregated based on market segments, region data may be aggregated based on climates, selling entity data (salespeople, representative, etc.) May be aggregated based on performance. Each of these aggregations are exemplary, and illustrative of the options for aggregation provided in part due to use of the OLAP cube. These aggregations may be employed for a variety of purposes, including simple reporting, analysis, or export to other systems for example.

Impacts of changes are often an important goal of analysis, watches, judgments, aggregations or any other exercises carried out on financial data. The system automatically determines what the biggest impacts are and displays them by absolute rank and relative change percentage—basically by tracking changes as they occur and maintaining a set of lists of such information. This allows users to drill down into sources of the biggest impacts. Moreover, impacts are provided according to whatever the drill down perspective is, (such as through context sensitive impacts) in some embodiments.

Multiple Organization Considerations

The system described above can be used profitably by a single organization. However, having multiple organizations using the same system requires that data be segregated to satisfy confidentiality concerns, for example. As indicated previously, data repositories may be separate, either logically or physically (or both). Moreover, processing facilities may also be separated, logically and/or physically. Thus, a first user may use a first client to access a system, and thereby access a first data repository using an OLAP cube. A second user may use a second client to access the system. In so doing, the second user may access a second data repository, and would preferably use a different OLAP cube or at least a different instantiation of an OLAP cube or cubes.

Thus, each user, or at least each organization, has access to OLAP cubes which in turn work only with data from a dedicated repository. Moreover, each dedicated repository may have associated with it customizations for the organization and/or user in question. Thus, an instance of an OLAP cube may effectively be customized for the user or organization when access to the dedicated repository is granted.

By providing dedicated instances of OLAP cubes and dedicated repositories, a flexible structure which may be hosted across multiple servers is formed. This supports providing a web-hosted application, such as through use of asp technology. Multiple users or organizations may be supported through dedicated repositories, dedicated instances of OLAP cubes, and shared supporting software and physical resources. Similarly, this architecture does not tie down the location of physical resources, allowing for either distributed resources (such as geographically separated servers and networks for example) or concentrated resources (such as server farms for example). Considerations such as geographic diversity/redundancy or ease of maintenance may come into play because the technology allows for such flexibility.

From the foregoing, it will be appreciated that specific embodiments of the invention have been described herein for purposes of illustration, but that various modifications may be made without deviating from the spirit and scope of the invention. In some instances, reference has been made to characteristics likely to be present in various or some embodiments, but these characteristics are also not necessarily limiting on the spirit and scope of the invention. In the illustrations and description, structures have been provided which may be formed or assembled in other ways within the spirit and scope of the invention. Moreover, in general, features from one embodiment may be used with other embodiments mentioned in this document provided the features are not somehow mutually exclusive.

In particular, the separate modules of the various block diagrams represent functional modules of methods or apparatuses and are not necessarily indicative of physical or logical separations or of an order of operation inherent in the spirit and scope of the present invention. Similarly, methods have been illustrated and described as linear processes, but such methods may have operations reordered or implemented in parallel within the spirit and scope of the invention. Accordingly, the invention is not limited except as by the appended claims.

We claim:

1. A real-time collection and analysis computer implemented system configured for use with a first client and a second client, the system comprising:

an analysis server coupled to the first client, the analysis server including a centralized OLAP cube that provides collection and analysis of forecast data in real-time and the committing of changes and collaborative communication in real-time; and a first customer database of information coupled to the analysis server and to the OLAP cube to receive essentially real-time updates of forecast data from said first client, the first customer database is to embody forecast data and to receive essentially real-time updates to the forecast data, wherein the forecast data includes at least one estimated forecast value;

the first customer database is dedicated to use by a first set of selected identified users belonging to the first customer of the system;

an identification database and identification server coupled to the first client and coupled to the first customer database, the identification database and identification server configured to identify and authenticate the first set of selected identified users and the customer to which they belong, the identification and authentication facilitating an understanding of data contributed by and entering the system from the first customer wherein updates from a first set of selected identified users is directed to the first customer database;

the system is configured to support a multi-tenant environment including the first client and the first customer database of information and the second client and a second customer database of information;

the second client coupled to the identification server and identification database and to the analysis server; and the second customer database of information coupled to the identification server and identification database and the analysis server, the second customer database dedicated to use by a second set of users of the system, the identification server and identification database further configured to authenticate the second set of users and the second customer to which they belong, the identification and authentication facilitating an understanding of data contributed by and entering the system from the second customer wherein updates from a second set of users is directed to the second customer database.

2. The system of claim 1, wherein: the first client is a smart client, and the first client includes an OLAP cube that permits real-time capture of the data and for communicating the real-time changes in aggregate through the OLAP cube to the system.

3. The system of claim 1, wherein: the information is forward looking financial data comprising a financial forecast information.

4. The system of claim 1, wherein: the first customer database includes watches of data, wherein a watch is a substantially real-time user notification triggered when a selected value reaches a predetermined threshold, and wherein a user creates and saves one or collections of watches with corresponding messages including messages that are converted to customized reports.

5. The system of claim 1, wherein: the first customer database includes sales forecast prediction data.

6. The system of claim 1, wherein: the first customer database includes sales forecast data with changes from non-member personnel.

7. The system of claim 1, wherein:
the different customer data is segregated into different logical and/or physical data repositories, and a first user associated with the first customer uses a first client to access the system and access a first dedicated data repository using a first OLAP cube or a first instantiation of an OLAP cube, and a second user associated with the second customer uses a second client to access the system and access a second dedicated data repository using a second OLAP cube or a second instantiation of the OLAP cube; and
each first and second dedicated repository has associated with different first and second respective customizations for the particular first or second customer.

8. The system of claim 7, wherein:
the identification database and identification server configured to identify and authenticate the users and the customer to which they belong, the identification facilitating an understanding of data contributed by and entering the system from the customer wherein updates from users is directed to the customer database.

9. The system of claim 1, wherein: the system acquires and analyzes financial forecast data including forecast predicted financial information and the information database stores the forecast predicted financial information.

10. The system in claim 1, wherein the update to the forecast data includes an update to the at least one estimated financial forecast value.

11. The system of claim 1, wherein:
the first client supports a first group of users associated with the first customer and the second client supports a second group of users associated with the second customer in the multi-tenant environment; and
the system further stores and analyzes changes that enter the system in isolation from the first and second groups of users.

12. The system in claim 1, wherein: the information database coupled to the analysis server is an element of the analysis server.

13. A real-time collection and analysis computer implemented system configured for use with a first client and a second client, the system comprising:
an analysis server coupled to the first client, the analysis server including a centralized OLAP cube that provides collection and analysis of forecast data in real-time and the committing of changes and collaborative communication in real-time; and
a first customer database of information coupled to the analysis server and to the OLAP cube to receive essentially real-time updates of forecast data from said first client, the first customer database is to embody forecast data and to receive essentially real-time updates to the forecast data, wherein the forecast data includes at least one estimated forecast value;
the analysis server incorporating an OLAP cube therein, the OLAP cube to capture data in real-time from the first client and to analyze and update the information of the first customer database including to update the forecast data and to propagate the updates in real time through the OLAP cube;
the first customer database is dedicated to use by a first set of selected identified users belonging to the first customer and coupled to the analysis server to receive essentially real-time updates of forecast data from the first client, the first customer database is to embody first forecast data and to receive essentially real-time updates to the first forecast data, wherein the first forecast data includes at least one first estimated forecast value; and
the system further includes:
a second customer database dedicated to use by a second set of selected identified users belonging to the second customer and coupled to the analysis server to receive essentially real-time updates of forecast data from a second client, the second customer database is to embody second forecast data and to receive essentially real-time updates to the second forecast data, wherein the second forecast data includes at least one second estimated forecast value, the second customer database is dedicated to use by a second set of selected identified users of the system; and
an identification server and identification database coupled to the first client and the second client and coupled to the first customer database and the second customer database, the identification server and identification database configured to identify and authenticate the first set of selected identified users and the second set of selected identified users, the identification and authentication facilitating an understanding of data contributed by and entering the system from the first customer and from the second customer wherein updates from a first set of selected identified users and from a first set of selected identified users is directed to the first customer database.

14. The system of claim 13, wherein: the first customer database is dedicated to use by a first set of selected identified users belonging to the first customer of the system; and further comprising:
an identification database and identification server coupled to the first client and coupled to the first customer database, the identification database and identification server configured to identify and authenticate the first set of selected identified users and the customer to which they belong, the identification and authentication facilitating an understanding of data contributed by and entering the system from the first customer wherein updates from a first set of selected identified users is directed to the first customer database.

15. A computer implemented method of maintaining information on a computer system for use with a first client and first customer and a second client and second customer, the method comprising:
receiving a set of forecast data by an analysis server coupled to the first client, the analysis server including a centralized OLAP cube that provides collection and analysis of forecast data in real-time and the committing of changes and collaborative communication in real-time;
maintaining a first customer database of information dedicated to use by a first set of selected identified users belonging to the first customer and coupled to the analysis server and to the OLAP cube to receive essentially real-time updates of forecast data from said first client, the first customer database is to embody forecast data and to receive essentially real-time updates to the forecast data, wherein the forecast data includes at least one estimated forecast value, the first forecast data includes at least one first estimated forecast value;
maintaining a second customer database dedicated to use by a second set of selected identified users belonging to the second customer and coupled to the analysis server and to the OLAP cube to receive essentially real-time updates of forecast data from a second client, the second customer database is to embody second forecast data and to receive essentially real-time updates to the second forecast data, wherein the second forecast data includes at least one second estimated forecast value;

capturing data in real-rime by the OLAP cube from at least one of the first client the second client and analyzing and updating the information of the first customer database or the second customer database depending upon the identity of client and customer, including to update the forecast data and to propagate the updates in real time through the OLAP cube;

maintaining an identification server and an identification database coupled to the first client and the second client and coupled to the first customer database and the second customer database; and identifying and authenticating the first set of selected identified users and the second set of selected identified users, the identification and authentication facilitating an understanding of data contributed by and entering the computer system from the first customer and from the second customer wherein updates from a first set of selected identified users and from a first set of selected identified users is directed to the first customer database.

16. The method of claim 15, further comprising:

watching a set of user-selected watched data points of the information, a user-selected watch data point being a substantially real-time user notification triggered when a selected value for the data point reaches a predetermined threshold set by the user; and notifying a user of chances in the set of user-selected watched data points responsive to the propagating and receiving updates.

17. The method of claim 15, further comprising:

providing information to a user;

receiving expected changes data of the information from the user at the server that includes the OLAP cube; and propagating the received expected changes data as updates almost immediately in essentially real-time throughout the information through the server and the OLAP cube.

18. The method of claim 15, further comprising:

reviewing updates received and propagated through the information; and providing user-readable updates of information responsive to the reviewing.

19. The method of claim 15, wherein: the forecast data comprises forecast predicted financial information.

20. The method of claim 15, wherein: the method is executed by a processor in response to instructions, the instructions embodied in a tangible machine-readable medium.

21. The method of claim 15, further comprising:

receiving actual historical data corresponding to the same subject as the forecast predicted information;

comparing the actual historical data to the forecast predicted information; and providing user-readable comparisons of the forecast predicted information and the corresponding actual historical data.

22. The method of claim 18, wherein the user-readable updates provide an ability for a user to review the change data in the system and provide a comment for a forecast for consideration by other users.

* * * * *